US010520165B1

(12) United States Patent
Mao et al.

(10) Patent No.: US 10,520,165 B1
(45) Date of Patent: Dec. 31, 2019

(54) LASER ILLUMINATION LIGHTING DEVICE WITH SOLID MEDIUM FREEFORM PRISM OR WAVEGUIDE

(71) Applicant: ABL IP HOLDING LLC, Conyers, GA (US)

(72) Inventors: An Mao, Jersey City, NJ (US); Guan-Bo Lin, Reston, VA (US); Rashmi Kumar Rogers, Herndon, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/030,193

(22) Filed: Jul. 9, 2018

(51) Int. Cl.
| F21V 29/70 | (2015.01) |
| F21V 9/30 | (2018.01) |
| F21V 13/14 | (2006.01) |
| F21V 25/10 | (2006.01) |
| F21V 7/00 | (2006.01) |
| F21Y 115/30 | (2016.01) |

(52) U.S. Cl.
CPC .............. *F21V 9/30* (2018.02); *F21V 7/0091* (2013.01); *F21V 13/14* (2013.01); *F21V 25/10* (2013.01); *F21V 29/70* (2015.01); *F21Y 2115/30* (2016.08)

(58) Field of Classification Search
CPC . F21V 9/30; F21V 9/70; F21V 7/0091; F21V 13/14; F21V 25/10; F21V 2115/30
USPC .......................................................... 362/84
See application file for complete search history.

(56) References Cited

U.S. PATENT DOCUMENTS

| 6,483,613 B1 | 11/2002 | Woodgate et al. |
| 6,870,671 B2* | 3/2005 | Travis .................... G02B 6/003 |
| | | 348/804 |
| 2009/0067156 A1* | 3/2009 | Bonnett ............... G02B 6/0068 |
| | | 362/97.2 |
| 2011/0279039 A1 | 11/2011 | Kishimoto |
| 2012/0050645 A1* | 3/2012 | Okada ............... G02F 1/133608 |
| | | 349/64 |
| 2013/0250381 A1 | 9/2013 | Toko et al. |

(Continued)

OTHER PUBLICATIONS

Non-final Office Action for U.S. Appl. No. 16/227,128, dated Oct. 21, 2019, 17 pages.

(Continued)

*Primary Examiner* — Ali Alavi
(74) *Attorney, Agent, or Firm* — RatnerPrestia

(57) ABSTRACT

An example lighting device has a luminaire. The luminaire includes a laser light source configured to be driven by electrical power to emit laser light rays, a phosphor plate, and a solid medium freeform prism or waveguide. The solid medium freeform prism or waveguide confines incoming laser light ray emitted from the laser light source inside the solid medium until conversion into illumination lighting by the phosphor plate. The solid medium includes an input surface or lens coupled to the laser light source, an output surface, and a highly reflective internal surface to reflect laser light rays to propagate inside the solid medium until emission through the output surface. The phosphor plate is coupled to the output surface of the solid medium to convert the reflected laser light rays into the illumination lighting to emit from the luminaire.

20 Claims, 14 Drawing Sheets

(56) References Cited

U.S. PATENT DOCUMENTS

| | | |
|---|---|---|
| 2014/0036361 A1* | 2/2014 | Woodgate .............. H04N 13/00 |
| | | 359/466 |
| 2015/0088385 A1 | 3/2015 | Fleury |
| 2018/0038558 A1 | 2/2018 | Woisetschlaeger et al. |
| 2018/0038559 A1 | 2/2018 | Mueller |

OTHER PUBLICATIONS

Non-final Office Action for U.S. Appl. No. 16/227,028 dated Nov. 7, 2019, 21 pages.

* cited by examiner

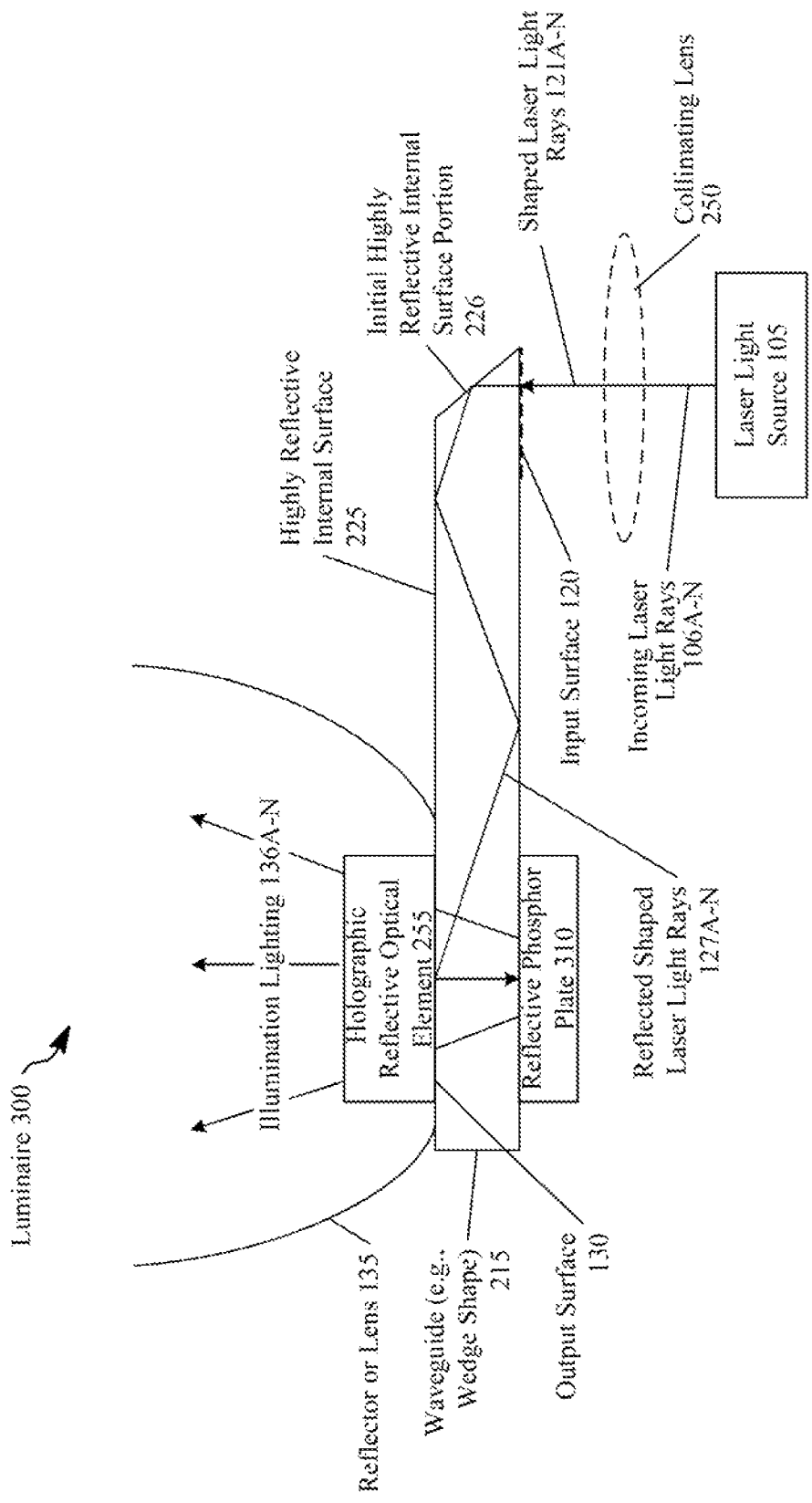

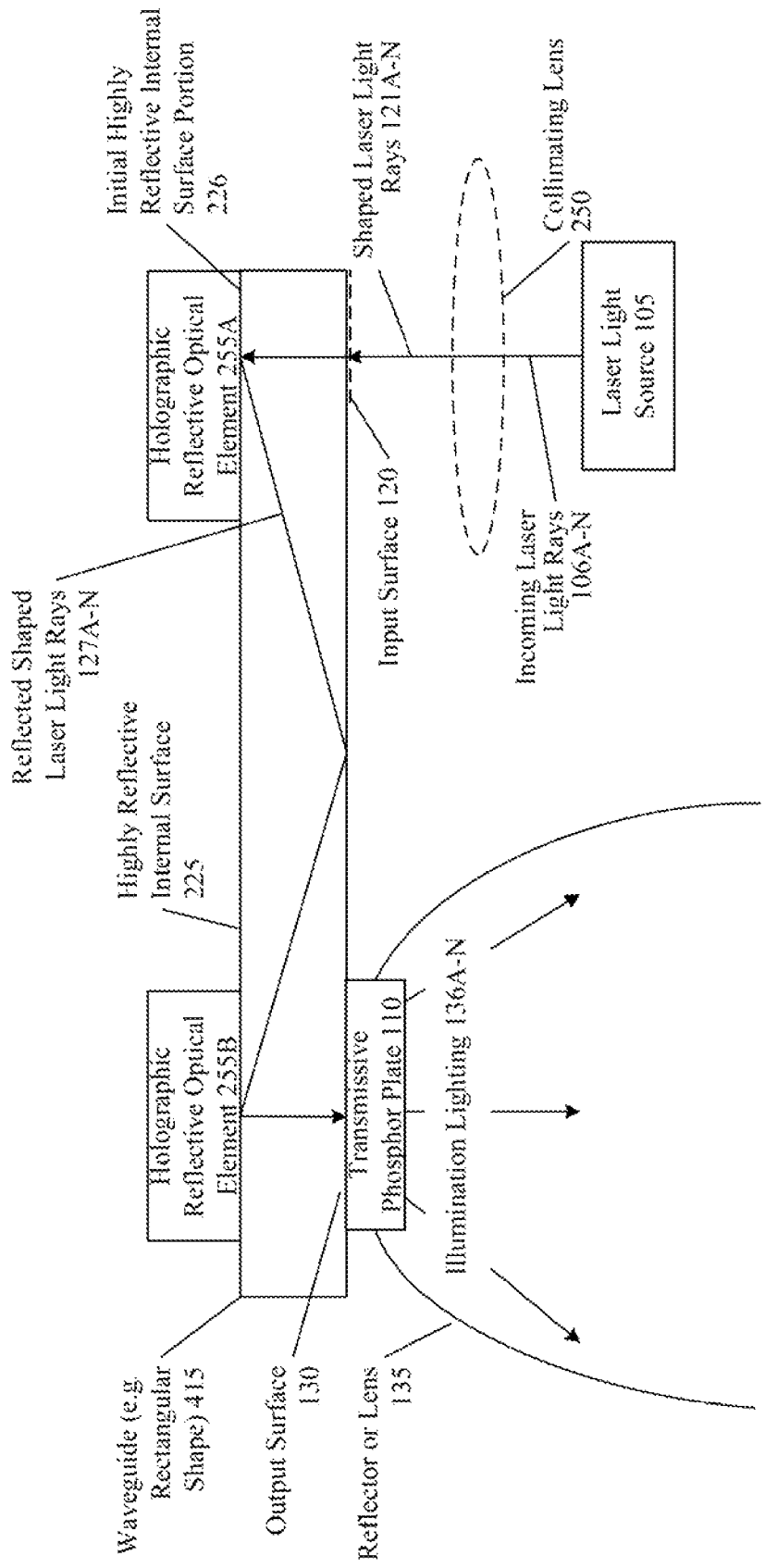
FIG. 4A  Luminaire 400A

LASER ILLUMINATION LIGHTING DEVICE WITH SOLID MEDIUM FREEFORM PRISM OR WAVEGUIDE

TECHNICAL FIELD

The present subject matter relates to a lighting device, e.g., a luminaire or a light fixture for illumination lighting, which includes a solid medium, such as a freeform prism or a waveguide, with techniques for generating illumination lighting from laser light.

BACKGROUND

Light emitting diode (LED) based illumination lighting has limitations. LEDs, for example, typically emit light over a rather broad angular output field, typically called Lambertian angular distribution with 120-degree beam angle (full-width at half-maximum). To achieve high brightness and a narrow beam, for example for use in a high bay light application, many LEDs are needed which increases the weight and bulkiness of the luminaire. Even with optical elements to somewhat narrow the output angle range, some light often is lost outside the desired area of illumination, for example, at ground or floor level in the high bay light application. Achieving a high brightness and a narrow beam in a downlight application also requires a luminaire with a large form factor.

Laser light sources are good pumping sources and have high power in a relatively small package with extremely strong directionality. But because of safety concerns and low optical efficiency, blue laser light sources are typically not utilized as a light source for illumination lighting in the lighting industry. Blue laser light is not dangerous because of the wavelength of blue colored light, but rather because the laser light beam is highly focused and coherent, resulting in a high power density light source.

Although blue laser light sources have been utilized in automobile headlamp applications, the designs for those lighting devices involve several mirrors to deflect the blue laser light and have many air gaps. The air gaps and mirrors in the design of such lighting devices are problematic for several reasons. In the event of breakage of the lighting device (e.g., during an automobile accident), the blue laser light is not confined and escapes outside, which can harm a living organism exposed to the blue laser light directly, or even indirectly. Accordingly, incorporating a blue laser light source into a lighting device for illumination lighting in a safe and optically efficient design is difficult.

SUMMARY

In an example, a lighting device includes a luminaire. The luminaire includes a laser light source configured to be driven by electrical power to emit laser light rays and a phosphor plate. The luminaire further includes a solid medium freeform prism or waveguide to confine incoming laser light rays emitted from the laser light source inside the solid medium freeform prism or waveguide until conversion into illumination lighting by the phosphor plate. The solid medium freeform prism or waveguide includes an input surface or lens coupled to the laser light source to shape the incoming laser light rays passing through and entering inside the solid medium waveguide freeform prism or waveguide into shaped laser light rays. The solid medium freeform prism or waveguide further includes an output surface and a highly reflective internal surface to reflect the shaped laser light rays to propagate inside the solid medium freeform prism or waveguide until emission through the output surface. The output surface emits the reflected shaped laser light rays to the phosphor plate. The phosphor plate is coupled to the output surface of the solid medium freeform prism or waveguide to convert the reflected shaped laser light rays into the illumination lighting to emit from the luminaire. The lighting device further includes a laser light source driver coupled to the laser light source to selectively control the laser light source to emit the laser light rays.

In one example, a lighting device includes a luminaire. The luminaire includes a laser light source configured to be driven by electrical power to emit laser light rays and a phosphor plate. The luminaire further includes a solid medium freeform prism to confine incoming laser light rays emitted from the laser light source inside the solid medium freeform prism until conversion into illumination lighting by the phosphor plate. The solid medium freeform prism includes an input surface coupled to the laser light source to shape the incoming laser light rays passing through and entering inside the solid medium freeform prism into shaped laser light rays. The solid medium freeform prism further includes an output surface and a highly reflective internal surface to reflect the shaped laser light rays to propagate inside the solid medium freeform prism until emission through the output surface. The output surface emits the reflected shaped laser light rays to the phosphor plate. The phosphor plate is coupled to the output surface of the solid medium freeform prism to convert the reflected shaped laser light rays into the illumination lighting to emit from the luminaire. The lighting device further includes a laser light source driver coupled to the laser light source to selectively control the laser light source to emit the laser light rays.

In another example, a lighting device includes a luminaire. The luminaire includes a laser light source configured to be driven by electrical power to emit laser light rays and a phosphor plate. The luminaire further includes a solid medium waveguide to confine incoming laser light rays emitted from the laser light source inside the solid medium waveguide until conversion into illumination lighting by the phosphor plate. The solid medium waveguide includes an input surface coupled to the laser light source for incoming laser light rays emitted by the laser light source to enter the solid medium waveguide. The solid medium waveguide further includes an output surface and a highly reflective internal surface to steer the laser light rays passing through the solid medium waveguide to the phosphor plate. The highly reflective internal surface includes an initial highly reflective internal surface portion to initially reflect the laser light rays to propagate inside a remainder the solid medium waveguide. The phosphor plate is coupled to the solid medium waveguide to convert the reflected laser light rays into the illumination lighting. The lighting device further includes a laser light source driver coupled to the laser light source to selectively control the laser light source to emit the laser light rays.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 3A is a schematic view of a luminaire, including the solid medium waveguide with the wedge-shape positioned in between the laser light source and a reflective phosphor plate.

FIG. 4A is a schematic view of a luminaire, including a solid medium waveguide with a rectangular-shape positioned in between the laser light source and the transmissive phosphor plate.

DETAILED DESCRIPTION

Figure 1A:
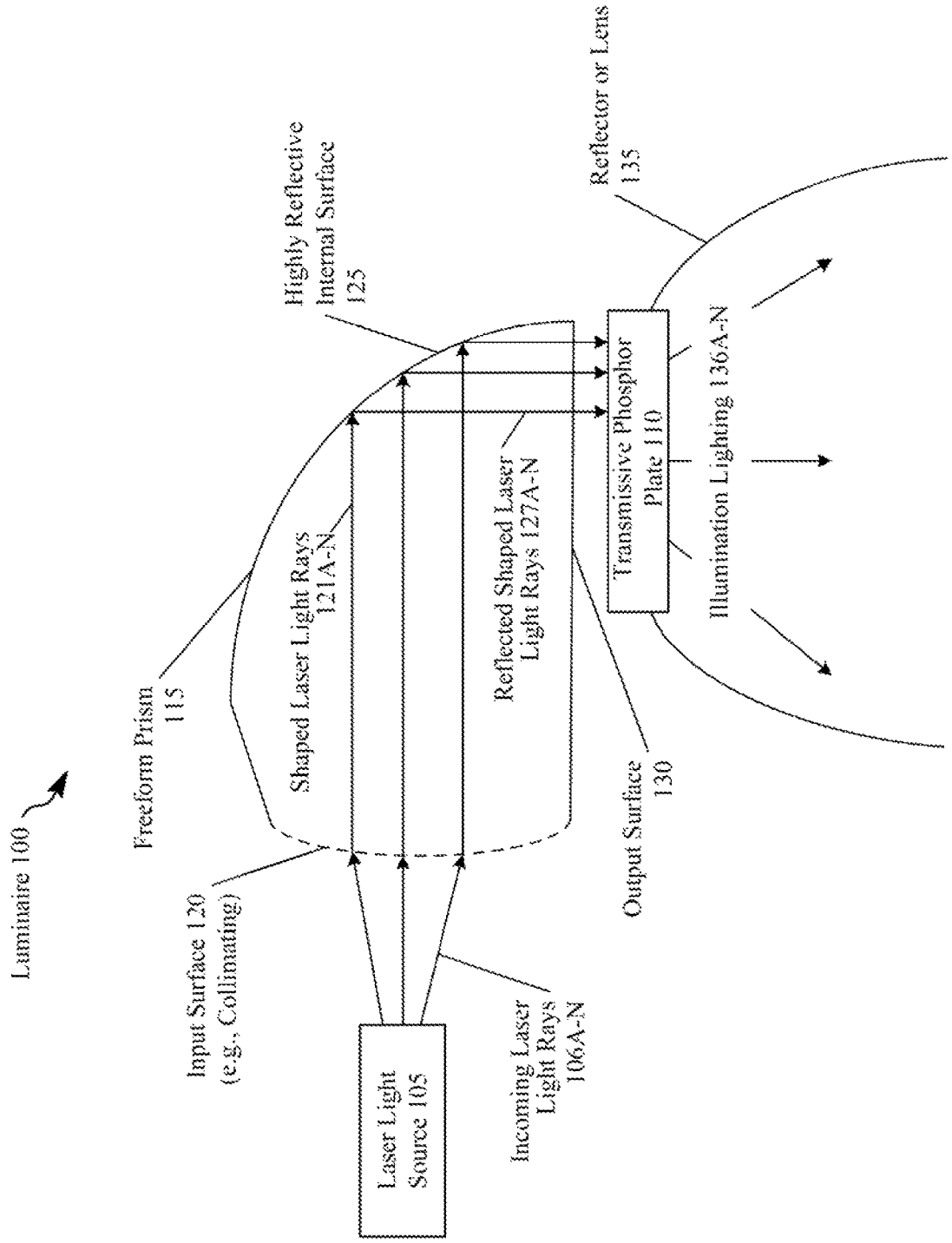
FIG. 1A is a schematic view of a luminaire, including a solid medium freeform prism with a highly reflective internal surface positioned in between a laser light source and a transmissive phosphor plate.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In order to improve the safety and optical efficiency of utilizing a laser light source (e.g., blue, violet, ultraviolet, infrared, or near-infrared), a lighting device includes a solid medium freeform prism or waveguide. The term "solid medium," as used herein, refers to an object that is firm and stable in shape, not hollow, and does not contain any air gaps or empty spaces inside. In the examples herein, the solid medium can be formed of various suitable materials, including acrylic, glass, silicone, fused silica, or a combination thereof. Fused silica provides excellent thermal properties for high optical power applications that include laser light sources. The solid medium freeform prism or waveguide confines (e.g., traps) and transports laser light rays emitted from a laser light source inside until conversion into illumination lighting by a phosphor plate to generate high lumen output with a small emitting surface. In the examples herein, the laser light is mostly confined because the index of refraction of the solid medium is higher than air. According to Snell's law, light travelling inside the solid medium with incident angle larger than the critical angle, i.e. arcsine of refractive index of the solid medium to that of air, will be totally reflected. A fiber optic cable is an example of a cylindrical shaped solid medium, which transports light, but is not utilized for illumination lighting purposes.

Compared to a lighting device with light emitting diode (LED) light sources, the laser light source lighting device can have other unique advantages. First, because of the high power and relatively small package of the laser light sources, fewer laser light sources are included in the luminaire, which leads to a smaller form factor. Second, the laser light sources have low efficiency droop with increasing current density. In other words, laser diodes can be operated at much higher current density without too much sacrifice of efficiency. GaN-based LDs typically are operated in the range of $kA/cm^2$ while GaN-based LEDs are typically operated in the range of $A/cm^2$. Finally, the small etendue of the laser light sources makes the lighting device ideal for applications with high lumen output in a small area (e.g., for a narrow beam pattern). The laser light source lighting device can be utilized in different lighting applications, e.g., high bay light, downlight, or other lighting platforms.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination lighting out of the luminaire.

The orientations of the lighting device, luminaire, associated components and/or any complete devices incorporating a passive optical lens such as shown in any of the drawings, are given by way of example only, for illustration and discussion purposes. In operation for a particular variable optical processing application, the lighting device and passive optical lens may be oriented in any other direction suitable to the particular application 3 of the lighting device and the passive optical lens, for example up light or side light or any other orientation. Also, to the extent used herein, any directional term, such as lateral, longitudinal, left, right, up, down, upper, lower, top, bottom, and side, are used by way of example only, and are not limiting as to direction or orientation of any optic or component of an optic constructed as otherwise described herein.

In the discussion herein, a spot lighting application means a beam pattern with a spot lighting beam angle state, which is a beam angle from 4° to 20°. A flood lighting application means a beam pattern with a flood lighting beam angle state, which is a beam angle from 21° to 120°, but can be broken down into a regular flood lighting application and a wide flood lighting application. A regular flood lighting application means a beam pattern with a regular flood lighting beam angle state, which is a beam angle from 21° to 45°. A wide flood lighting application means a beam pattern with a wide flood lighting beam angle state, which is a beam angle from 45° to 120°. A diffuse lighting application means a beam pattern with a diffuse lighting beam angle state, which is a beam angle of 120° or more.

Reference now is made in detail to the examples illustrated in the accompanying drawings and discussed below.

FIG. 1A is a schematic view of a luminaire 100, including a solid medium freeform prism 115 with a highly reflective internal surface 125 positioned in between a laser light source 105 and a transmissive phosphor plate 110. The terms "highly reflective" or "high reflectance" as used herein, refers to 90% of light is reflected. The solid medium freeform prism 115 includes three salient surfaces in the example. Surface one is an input surface 120 (with or without an antireflective coating). Input surface 120 may be cylindrical or aspherical shaped. In an example, input surface 120 includes a convex shape to refract incoming laser light rays 106A-N, such as an aspherical or spherical shape (e.g., a conic section curve). Conic section curves are made by a plane intersecting a cone, and common conic sections include a parabola, hyperbola, ellipse, sphere, etc. Conic sections can be rotated in three-dimensional space to form aspherical or spherical portions with a conical surface, such as a paraboloid, hyperboloid, ellipsoid, oblate ellipsoid, spheroid, etc., which may be truncated. In one example, input surface 120 shapes (e.g., collimates) incoming laser light rays 106A-N when the laser light source 105 is placed at the focus of the input surface 120 into shaped laser light rays 121A-N, such that shaped laser light rays 121A-N are collimated to control the laser beam spot size. In another example, input surface 120 shapes (e.g., partially collimates or converges) incoming laser light rays 106A-N when the laser light source 105 is placed outside the focus of the input surface 120 into shaped laser light rays 121A-N, such that shaped laser light rays 121A-N are partially collimated or converged to control the laser beam spot size. Shaped laser light rays 121A-N that are partially collimated or converged instead of fully collimated may be advantageous in controlling the beam diameter of shaped laser light rays 121A-N to have a relatively small beam diameter compared to collimation. Input surface 120 shapes the incoming laser light rays 106A-N via refraction to achieve shaped laser light rays 121A-N that are collimated, partially collimated, or converged. In other examples, the input surface 120 can be a planar surface.

Surface two is the highly reflective internal surface 125 where most of the steering of the shaped laser light rays 121A-N (collimated, partially collimated, or converged) is done. Surface three is a final output surface 130, which is an exit surface (e.g., with or without an antireflective coating), and may be shaped to converge or diverge the laser light beam formed of reflected shaped laser light rays 127A-N. The output surface 130 may be cylindrical, spherical, or aspherical shaped.

Highly reflective internal surface 125 is formed (e.g., shaped with a contour) to output a particular laser light beam profile incident on the transmissive phosphor plate 110, and the contour determines the area(s) where the reflected shaped laser light rays 127A-N strike the transmissive phosphor plate 110 and how much laser light strikes those area(s). Where and how much of the reflected shaped laser light rays 127A-N strike the transmissive phosphor plate 110 for conversion into illumination lighting 136A-N depends on the lighting application (e.g., spot lighting, flood lighting, regular flood lighting, wide flood lighting, and diffuse lighting). The optical density of the transmissive phosphor plate 110 is also selected based on the lighting application.

In the specific example, the highly reflective internal surface 125 is half of a total internal reflection (TIR) lens shape so that no light exits the freeform prism 115 via the highly reflective internal surface 125. If angles of incidence of the shaped laser light rays 121A-N are desired which do not exceed the TIR critical angle, the reflective internal 125 can be coated with highly reflective metal layer(s) or films(s) (e.g. silver or aluminum) to form a metallized surface; or a dichroic film (e.g., dielectric stack) for high reflectance. The highly reflective internal surface 125 can be other shapes, which provide TIR of the incoming laser light rays 106A-N. However, TIR may occur without a specific TIR lens shape, in particular, TIR is a phenomenon, which occurs when the angle of incidence of the shaped laser light rays 121A-N exceed the TIR critical angle at the interface of a high refractive index material and a low refractive index material (air in this case).

Figure 7:
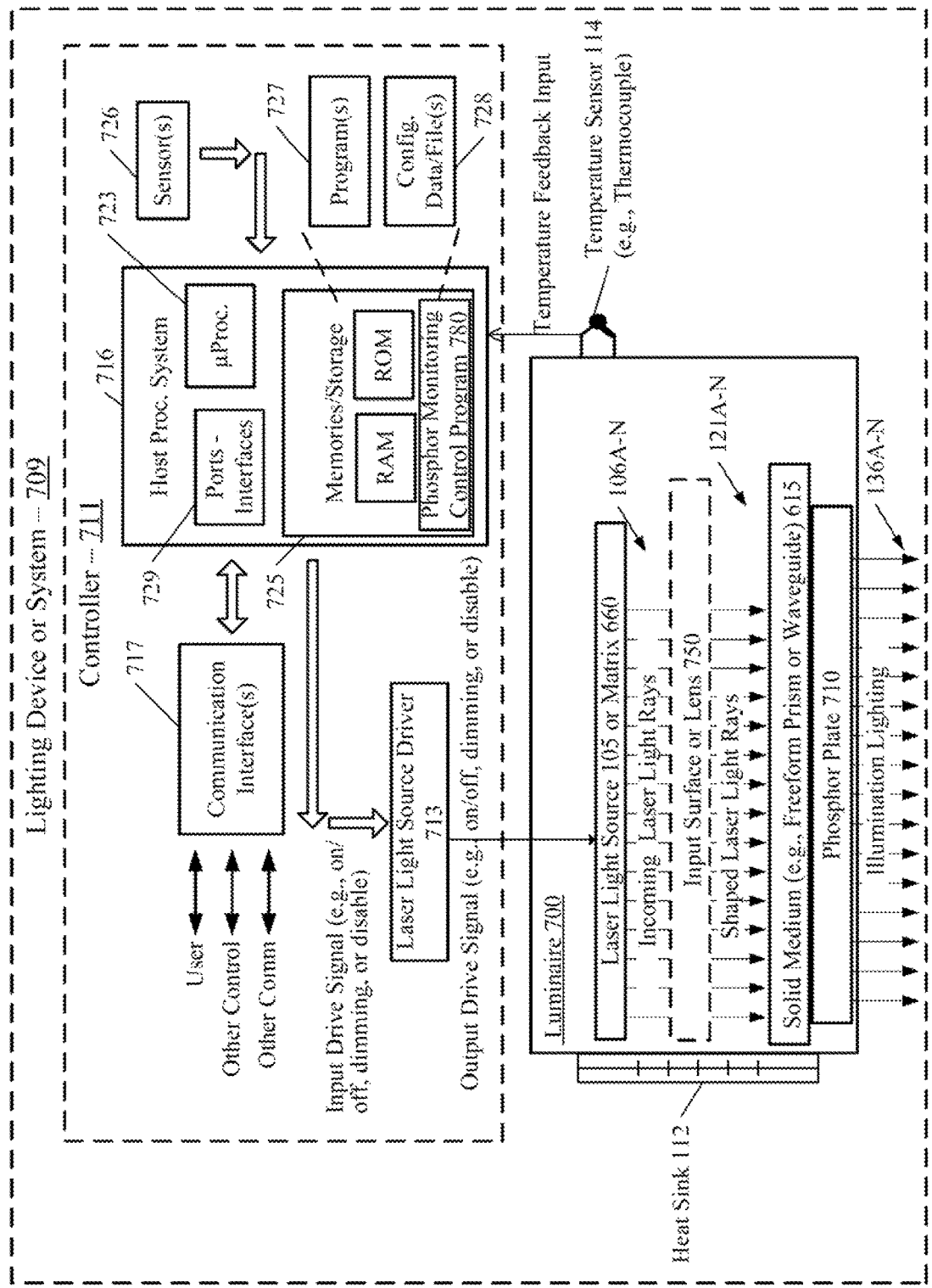
FIG. 7 is a functional block diagram of an example of a lighting device or system in which a luminaire includes a laser light source or matrix, a solid medium freeform prism or waveguide, and a phosphor plate.

Laser light source 105 is configured to be driven by electrical power to emit the laser light rays 106A-N, which strike the input surface 120. Laser light rays 106A-N may be blue, violet, ultraviolet, infrared, or near-infrared wavelength light. As shown in FIG. 7, a laser light source driver 713 coupled to the laser light source 105 selectively controls the laser light source 105 to emit the incoming laser light rays 106A-N. Blue/ultraviolet laser light source 105 may be a laser diode light source and can be fabricated with aluminum-indium-gallium-nitride-based (AlInGaN-based) semiconductors, which produce blue/ultraviolet light without frequency doubling. The laser light source 105 emits the incoming laser light rays 106A-N with a wavelength between 445 nanometer (nm) through 465 nm, including the "true blue" wavelength of 445-450 nm. The 445-465 nm wavelength incoming laser light rays 106A-N are closer to the peak sensitivity of the human eye and therefore appear brighter than 405 nm violet laser diode light sources. However, in some examples, the laser light source 105 can be included in the luminaire 100 that emits electromagnetic radiation between 249-480 nm, which covers ultraviolet, violet or blue wavelength. Electrically-pumped lasing from an AlGaInN-based quantum-well at room temperature can occur as low as the 249 nm wavelength. In some examples, laser light source 105 may emit electromagnetic radiation in the infrared wavelength. Typically, the incoming laser light rays 106A-N forming the laser light spot incident on the input surface 120 is an oval shape with a Gaussian distribution.

The transmissive phosphor plate 110 is a transmissive coating or layer deposited directly or indirectly on the output surface 130. Transmissive phosphor plate 110 includes a ceramic phosphor or a single-crystal phosphor, which have superior heat conduction properties for handling high heat and radiation. However, other phosphor types can be utilized, including various yellow phosphors. In one example, the transmissive phosphor plate 110 is sintered or high-temperature pressed-in phosphor ceramic available under from Lumileds Holding B.V. under the trade name Lumiramic®. Transmissive phosphor plate 110 may output illumination lighting 136A-N with a correlated color temperature of around 5100 Kelvin white. Other correlated color temperature, from warm white to cool white, may be derived by tuning phosphor formula. The luminance of the transmissive phosphor plate 110 from utilizing the laser light source 105 as the light pumping source can reach hundreds of candela/square millimeter, which is at least 10 times the luminance that a light emitting diode (LED) light source generates.

Solid medium freeform prism 115 confines the incoming laser light rays 106A-N emitted from the laser light source 105 inside the solid medium freeform prism 115 until conversion into illumination lighting 136A-N by the transmissive phosphor plate 110. Although incoming laser light rays 106A-N are not perfectly parallel, incoming laser light rays 106A-N have a smaller angular span than light beams from traditional light sources. For example, laser light source 105 coaxes photons into the same wave state to make a highly coherent laser light beam, in which the photons have a well-defined phase relation. The amount that the incoming laser light rays 106A-N diverge (e.g., spread out) depends on the laser light source 105 design, e.g., the dimension of the laser active region (e.g., thickness), ridge width, optical and electrical confinement layer layout, etc. Divergence can be manifested by shining the laser light beam on an object and observing the spot of the laser light beam grow larger while moving away from the object.

Solid medium freeform prism 115 includes an input surface 120 coupled to the laser light source 105. In FIG. 1A, the input surface 120 and the laser light source 105 are depicted as being coupled together with an air gap in between. However, enhanced safety can be provided by having a coupling between the input surface 120 and the laser light source 105 (either directly or indirectly) without an air gap between. The input surface 120 includes an antireflective coating and thus excludes reflective material. The antireflective coating is an optical coating to reduce reflection and improve efficiency by eliminating lost light. The antireflective coating can include transparent thin film structures with alternating layers of contrasting refractive indices.

In the example of FIG. 1A, the input surface 120 is a collimating type of input surface 120 with an aspherical or spherical shape. An input surface 120 highly collimates incoming laser light rays 106A-N (e.g., converges to have the same direction) emitted by the laser light source 105 passing through and entering inside the solid medium freeform prism 115, for example, focuses the incoming laser light rays 106A-N. It should be understood that a perfectly collimated laser beam (i.e., focused to infinity), however, is not actually possible due to diffraction. The incoming laser light rays 106A-N forming the laser light beam may form an oval shaped spot. The common beam angle full-width at half-maximum (FWHM) is around 5-7° in the short axis and 19-27° degree in the long axis. Again, this is mainly determined by geometry of the laser light source 105 design. Input surface 120 collimates the incoming laser light rays 106A-N passing through into the shaped laser light rays 121A-N, which appear converged. The shaped laser light rays 121A-N formed a circular shaped spot with a smaller light ray spread than the incoming laser light rays 106A-N.

Solid medium freeform prism 115 further includes an output surface 130 and a highly reflective internal surface 125 (e.g., TIR) to reflect the shaped laser light rays 121A-N (e.g., by undergoing TIR) to propagate inside the solid medium freeform prism 115 until emission through the output surface 130. Output surface 130 emits the reflected shaped laser light rays 127A-N (e.g., TIR collimated) to the transmissive phosphor plate 110. The output surface 130 includes an antireflective coating and excludes reflective material to maximize optical output efficiency to improve luminance output. Solid medium freeform prism 115 is shaped and the highly reflective internal surface 125 formed to keep the reflected shaped laser light rays 127A-N forming the laser light beam spot incident on the transmissive phosphor plate 110 as small as possible to enhance luminance of the output beam of the illumination lighting 136A-N. Transmissive phosphor plate 110 is coupled to the output surface 130 of the solid medium freeform prism 115 to convert the reflected shaped laser light rays 127A-N into the illumination lighting 136A-N to emit from the luminaire 100.

Luminaire 100 further includes a reflector or lens 135 coupled to transmissive phosphor plate 110 on the output surface 130 to shape a beam pattern of the emitted illumination lighting 136A-N. As shown, a direction of the incoming laser light rays 106A-N entering the input surface 120 is rotated 45 degrees to 90 degrees relative to the direction of the illumination lighting 136A-N emitted from the transmissive phosphor plate 110.

Figure 1B:
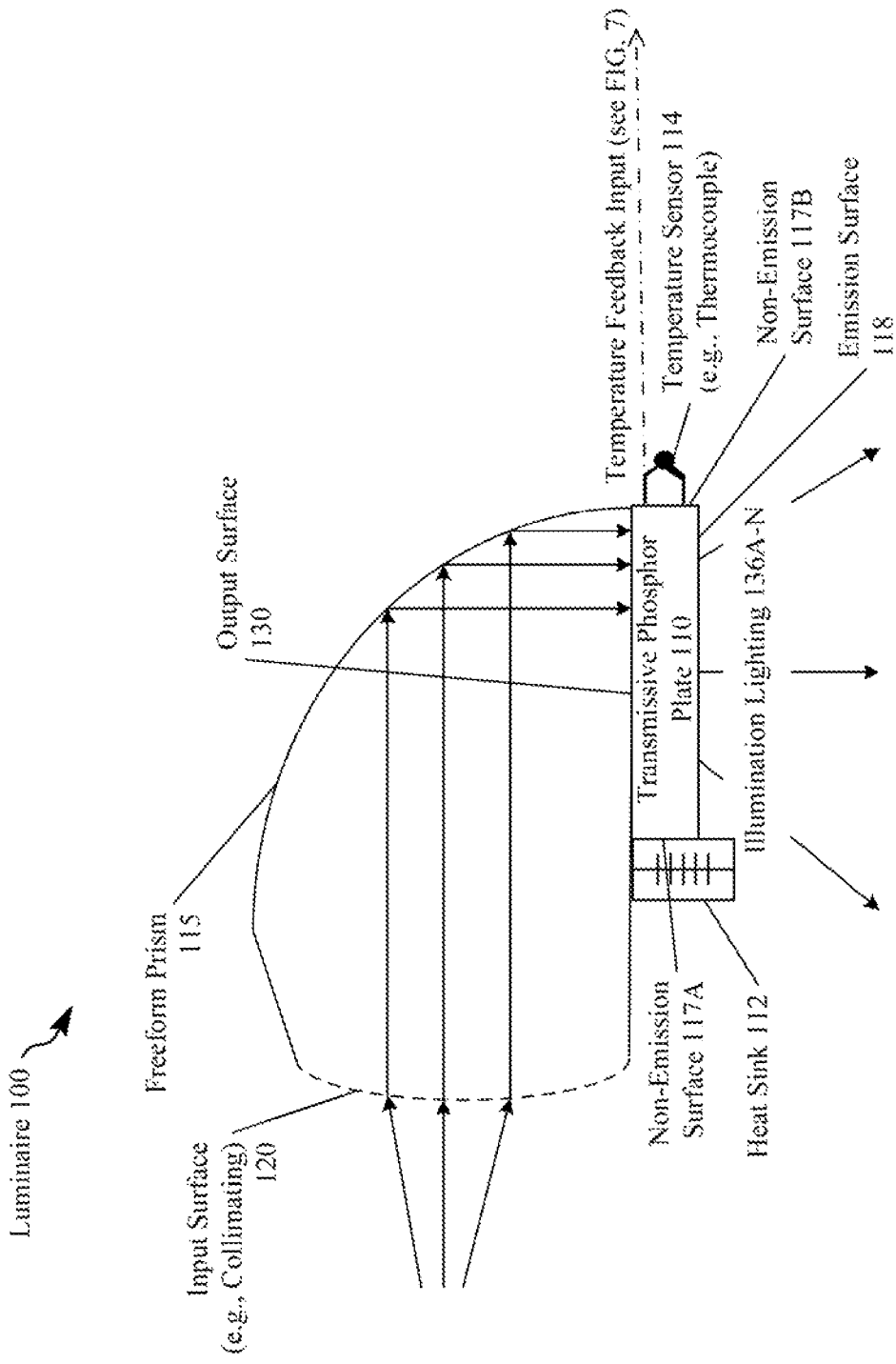
FIG. 1B is another schematic view of the luminaire of FIG. 1A with a heat sink and a temperature sensor coupled to the transmissive phosphor plate.

FIG. 1B is another schematic view of the luminaire 100 of FIG. 1A with a heat sink 112 and a temperature sensor 114 coupled to the transmissive phosphor plate 110. Heat sink 112 is a passive heat exchanger that transfers the heat generated by the transmissive phosphor plate 110 and to a cooling medium (e.g., air) to dissipate the heat from the luminaire 100. Heat sink 112 may be a metal heat sink, heat pipe, etc. In the transmissive phosphor plate 110 example, the heat sink 112 is coupled to the side non-emission surface 117A of the transmissive phosphor plate 110 where the illumination lighting 136A-N is not emitted.

The heat sink 112 is positioned to maximize the surface area in contact with the air-cooling medium, and therefore extends past the side non-emission surface 117A of the transmissive phosphor plate 110. However, the surface area of the heat sink 112 is somewhat constrained because the heat sink 112 ideally does not block, obstruct, or interfere with any of the illumination lighting 136A-N emitted by the transmissive phosphor plate 110. Hence, in the example luminaire 100 of FIG. 1B, the heat sink 112 is not positioned on the bottom emission surface 118 of the transmissive phosphor plate 110 where the illumination lighting 136A-N is emitted to avoid obstruction with the illumination lighting 136A-N. In some examples, the non-emission surfaces 117A-B may be a single continuous surface instead of discontinuous surfaces. Heat sink 112 may be coupled to both non-emission surfaces 117A-B to maximize conduction and heat exchange with the air-cooling medium.

Solid medium freeform prism 115 has various surfaces contoured to manipulate the beam profile, size, and angle of incidence of the reflected shaped laser light rays 127A-N on the transmissive phosphor plate 110. Size tuning is important for laser lighting applications because the transmissive phosphor plate 110 may have a beam profile threshold, which requires a specific incident area or luminance not to be exceeded to avoid premature wearing out or other failure of the phosphor layer of the transmissive phosphor plate 110.

Typically, excessive luminance manifests itself in the form of excess thermal energy or heat on the transmissive phosphor plate 110 of the luminaire 100. Phosphor degrades with rising temperature and usually fails due to so-called thermal quenching, i.e., phosphor conversion efficiency suddenly drops to zero if critical temperature of thermal quenching is met. To detect actual phosphor layer failure or the potential for phosphor layer failure, the luminaire 100 includes a temperature sensor 114. Temperature sensor 114 produces a temperature feedback input (e.g., temperature-dependent voltage output or other temperature measurement signal) of the transmissive phosphor plate 110. In one example, temperature sensor 114 includes a thermocouple, which is an electrical device that has two dissimilar electrical conductors forming electrical junctions at differing temperatures. The thermocouple produces the temperature-dependent voltage output based on the difference of temperatures using the thermoelectric effect. In other examples, the temperature sensor 114 includes a thermistor, resistance thermometer, or silicon bandgap temperature sensor to produce the temperature feedback input.

As shown in FIG. 7, a laser light source driver 713 is coupled to the laser light source 105. Laser light source driver 713 selectively controls the laser light source 105 to emit the incoming laser light rays 106A-N. The selective control of laser light source driver 713 includes receiving the temperature feedback input of the temperature sensor 114. In response to the temperature feedback input exceeding a temperature threshold, laser light source driver 713 turns off the laser light source 105. The processing of the temperature feedback input is implemented in the host processing system 716 or other components of the controller 711 of the lighting device or system 709 of FIG. 7, which control the laser light source driver 713.

In the transmissive phosphor plate 110 example, the temperature sensor 114 is coupled to the side non-emission surface 117B of the transmissive phosphor plate 110 where the illumination lighting 136A-N is not emitted. Hence, the location of the temperature sensor 114 on the side non-emission surface 117B avoids blocking, obstructing, or interfering with the illumination lighting 136A-N emitted from the bottom emission surface 118.

Figure 2A:
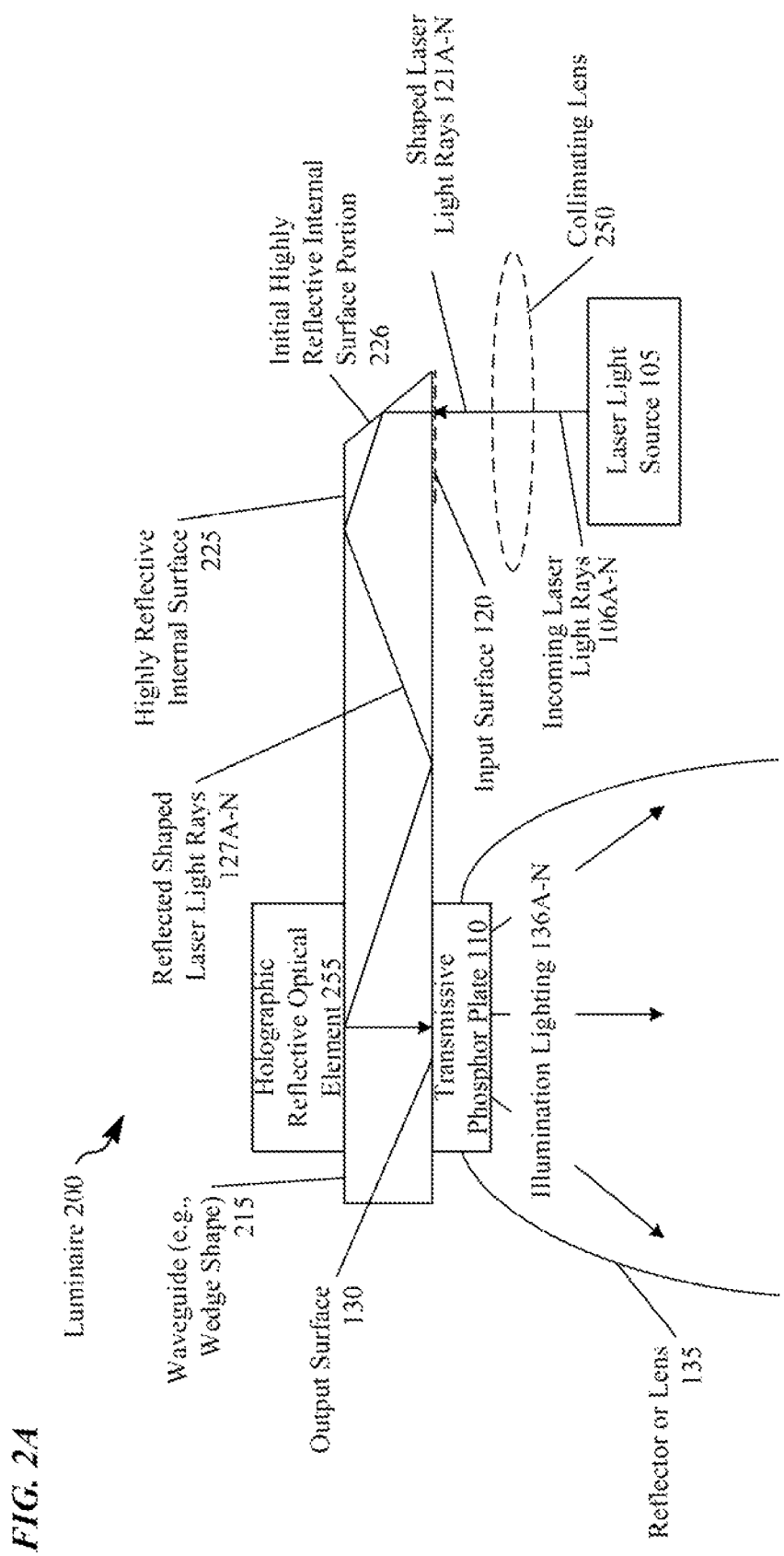
FIG. 2A is a schematic view of a luminaire, including a solid medium waveguide with a wedge-shape positioned in between the laser light source and the transmissive phosphor plate.

FIG. 2A is a schematic view of a luminaire 200, including a solid medium waveguide 215 positioned in between the laser light source 105 and the transmissive phosphor plate 110. As shown in the example of FIG. 2A, the solid medium waveguide 215 is a light guide with a wedge shape to trap and transport laser light. Solid medium waveguide 215 confines the incoming laser light rays 106A-N emitted from the laser light source 105 inside the solid medium waveguide 215 until conversion into illumination lighting 136A-N by the transmissive phosphor plate 110.

Solid medium waveguide 215 includes an input surface 120 coupled to the laser light source 105 for incoming laser light rays 106A-N emitted by the laser light source 105 to enter the solid medium waveguide 215. Although only a single light ray trace is shown for the incoming laser light rays 106A-N in the example, it should be understood that there are many such light rays propagating to form the highly coherent laser light beam emitted by laser light source 105 like that shown in FIG. 1A.

Laser light from multiple laser light sources 105 may enter the input surface 120 from multiple directions and angles of incidence. The laser light source 105 may emit incoming laser light rays 106A-N from the edge to make the luminaire 200 edge lit, where the incoming laser light rays 106A-N propagate straight into the solid medium waveguide 215. The angles of the input surface 120, highly reflective internal surface 225, and the output surface 130 can be tuned, so the incoming laser light rays 106A-N meet the angle requirement for TIR, for example. In addition, the positioning of the holographic reflective optical element 255 may be adjusted. For example, the incoming laser light rays 106A-N may be directed straight into the solid medium waveguide 215 to strike the holographic reflective optical element 255 and then redirected to the transmissive phosphor plate 110.

Input surface 120 is in an optical path between laser light source 105 and the initial highly reflective internal surface portion 226. As is the case with the solid freeform prism 115 of FIG. 1A, the input surface 120 of the solid medium waveguide 215 also includes an antireflective film to minimize optical loss and excludes reflective material. In the example of FIG. 2A, the luminaire 200 further includes an optional collimating lens 250 for shaping incoming laser light rays 106A-N in an optical path between laser light source 105 and the input surface 120. Collimating lens 250 collimates the incoming laser light rays 106A-N emitted by the laser light source 105 passing through into shaped laser light rays 121A-N prior to striking the input surface 120. As shown in the example waveguides 215, 415, the input surface 120 may be shaped as a relatively planar surface that does not shape the incoming laser light rays 106A-N because the luminaires 200, 300, 400, 500 include the collimating lens 250 for shaping purposes. In other examples (e.g., without a collimating lens 250), input surface 120 includes a convex aspherical or spherical shaped surface to shape (e.g., collimate) via refraction the incoming laser light rays 106A-N emitted by the laser light source 105 passing through into shaped laser light rays 121A-N that are collimated prior to striking the initial highly reflective internal surface portion 226. Placing the laser light source 105 at the focus of the convex aspherical or spherical shaped input surface 120 collimates incoming laser light rays 106A-N. Placing the laser light source 105 outside the focus of the aspherical or spherical shaped input surface 120 partially collimates or converges the incoming laser light rays 106A-N. Hence, the input surface 120 can shape the incoming laser light rays 106A-N emitted by the laser light source 105 passing through into shaped laser light rays 121A-N that are collimated, partially collimated, or converged prior to striking the initial highly reflective internal surface portion 226. Solid medium waveguide 215 further include a highly reflective internal surface 225 to steer the reflected shaped laser light rays 127A-N passing through the solid medium waveguide 215 to the transmissive phosphor plate 110. The highly reflective internal surface 225 includes a total internal reflection (TIR) shaped portion, at least one highly reflective optical coating or layer, or a combination thereof. The at least one highly reflective optical coating or layer includes a dichroic film, a silvered mirror, or a combination thereof.

The principal purpose of the highly reflective internal surface 225 is to redirect the shaped laser light rays 121A-N to the transmissive phosphor plate 110, for example, utilizing TIR. Initial highly reflective internal surface 226 can include a highly reflective coating, such as silvered mirror or highly efficient multi-layer dichroic mirror to reflect the shaped laser light rays 121A-N with angles of incidence that do not exceed the TIR critical angle. Similarly, the highly reflective internal surface 225 includes the highly reflective coating to reflect the reflected shaped laser light rays 127A-N with angles of incidence that do not exceed the TIR critical angle. In one example, only initial highly reflective internal surface 226 needs to have a highly reflective coating if TIR is not valid. Shaped laser light rays 121A-N traveling inside the waveguide 215 can follow TIR by design if the shape of the initial highly reflective internal surface 226 is contoured correctly. The highly reflective coating ensures reflection of the shaped laser light rays 121A-N and the reflected shaped laser light rays 127A-N being coupled into the solid medium waveguide 215, and traveling inside the waveguide by TIR. A dichroic mirror provides highly reflectivity to propagate the reflected shaped laser light rays 127A-N coupling into the solid medium waveguide 215. In one example, the highly reflective coating is MIRO-SILVER® manufactured by ALANOD®, which is deposited as multiple coatings or layers.

Highly reflective internal surface 225 includes an initial highly reflective internal surface portion 226. Initial highly reflective internal surface portion 226 initially reflects the laser light rays 106A-N to propagate inside a remainder the solid medium waveguide 215. In the example of FIG. 2A, the solid medium waveguide 215 is a wedge shape and the initial highly reflective internal surface portion 226 includes the tapered surface of the wedge shape, which initially reflects the laser light rays 106A-N to propagate inside the remainder of the solid medium waveguide. In one example, the initial highly reflective internal surface portion 226 includes a TIR shape and the highly reflective internal surface 225 includes at least one highly reflective optical coating or layer.

Highly reflective internal surface 225 includes at least one holographic reflective optical element 255 to reflect the reflected shaped laser light rays 127A-N. In the example of FIG. 2A, the highly reflective internal surface 225 includes a single holographic reflective optical element 255 to reflect the reflected shaped laser light rays 127A-N towards the transmissive phosphor plate 110. In other examples like that shown in FIGS. 4A and 5, the highly reflective internal surface 225 includes multiple holographic reflective optical elements 255A-B. Transmissive phosphor plate 110 is is coupled to the output surface 130 of the solid medium waveguide 215. In the example, transmissive phosphor plate 110 absorbs the reflected shaped laser light rays 127A-N, which are blue light, and outputs excited yellow light in a random direction as illumination lighting 136A-N. Reflector or lens 135 can shape the illumination lighting 136A-N. Because the phosphor is not 100% efficient in the example, the outputted illumination lighting 136A-N includes a mixture of a majority of converted excited yellow light (e.g., over 90%) and a small percentage of unconverted light from the original light pumping source, which is blue light (e.g., less than 10%). Moreover, a very small percentage of the excited yellow light may also pass back inside the waveguide 215 instead of being outputted as illumination lighting 136A-N. The luminaire 200 further includes a reflector or lens 135, which is coupled to the output surface 130 to shape a beam pattern of the emitted illumination lighting 136A-N from the transparent phosphor plate 110. The highly reflective internal surface 225 and the holographic reflective element 255 have the ability to change the outputted beam size of the illumination lighting 136A-N. For example, solid medium waveguide 215 is shaped and the highly reflective internal surface 225 formed to keep the reflected shaped laser light rays 127A-N forming the laser light beam spot incident on the transmissive phosphor plate 110 as small as possible to enhance luminance of the output beam pattern of the illumination lighting 136A-N.

Holographic reflective optical element 255 is an optical element manufactured with holographic imaging processes or principles, such as a diffraction grating, filter, lens, or beam splitter. For example, holographic recording materials, such as a photoresists, silver halide, and a dichromated gelatin emulsion are utilized to manufacture a reference mask of a particular diffraction grating or lens (e.g., with alternating high/low refractive indices), and that reference mask is utilized to manufacture the holographic reflective optical element 255. Holographic reflective optical element 255 can be in the form of a thin flexible photopolymer film that can be applied to glass or acrylic surfaces of the solid medium waveguide 215. Holographic reflective optical element 255 is advantageous in terms of cost due to simple design, small size, etc. and is easily reproducible by embossing polymer materials. Holographic reflective optical element 255 is useful in laser lighting applications because laser is a coherent source. Such a coherent, narrow spectral width and highly collimated light, is a perfect match for such holographic optical elements utilizing diffraction principles. The diffraction pattern is highly sensitive to wavelength (light color) and uniform wave front (light direction). Holographic reflective optical element 255 is wavelength selective and may have a high diffraction efficiency, corresponding to large apertures of conventional lenses. Holographic reflective optical element 255 includes a diffraction pattern rendered as a thin film containing an index modulation throughout the thickness of the film, or as a surface pattern on the highly reflective internal surface 225. In FIG. 2A, holographic reflective optical element 255 behaves as a reflective type hologram in which incident blue light rays (shown as reflected shaped laser light rays 127A-N) are diffracted back on the same incident side of the holographic reflective optical element 255 towards the transmissive phosphor plate 110.

Figure 2B:
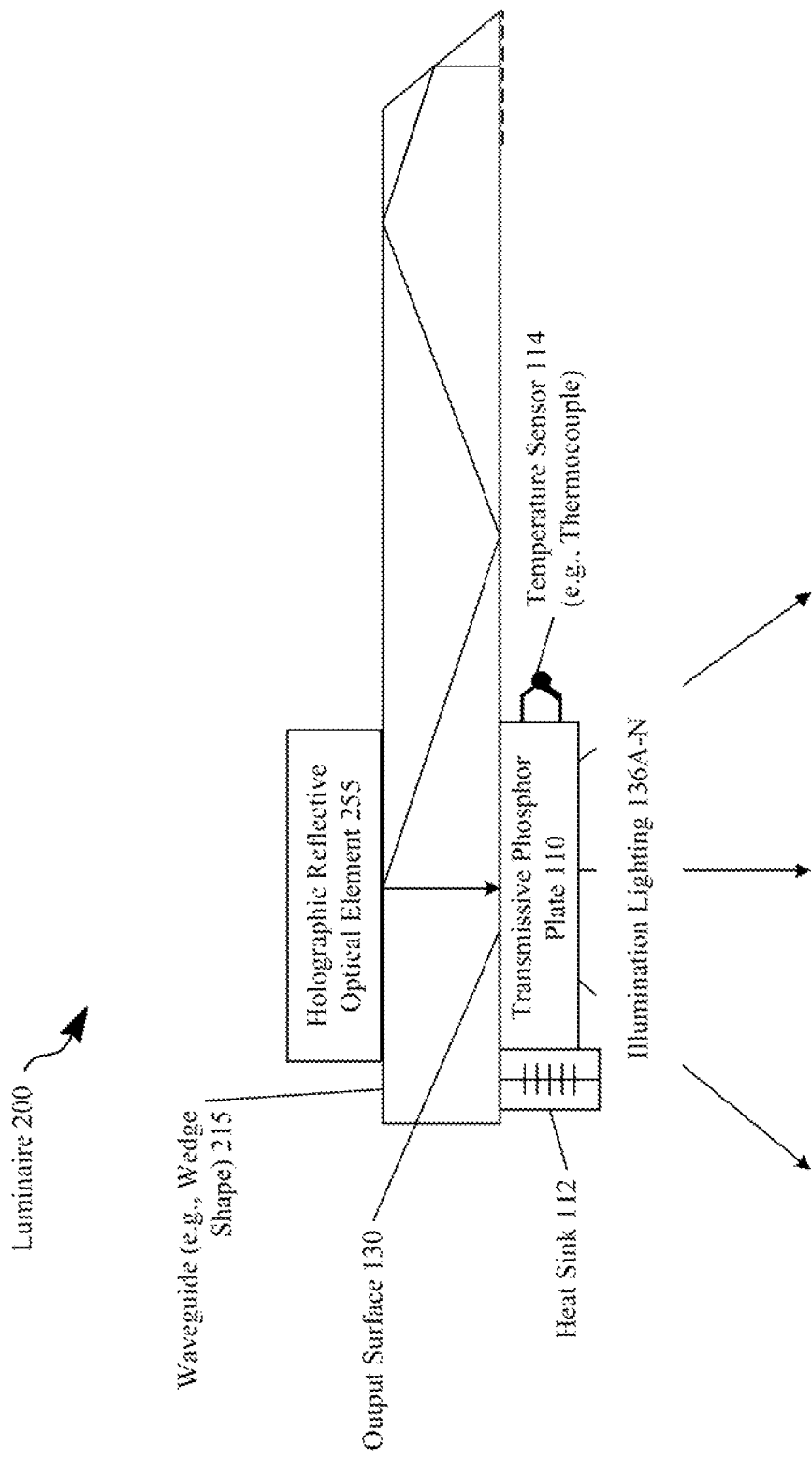
FIG. 2B is another schematic view of the luminaire of FIG. 2A with the heat sink and the temperature sensor coupled to the transmissive phosphor plate.

FIG. 2B is another schematic view of the luminaire 200 of FIG. 2A with the heat sink 112 and the temperature sensor 114 coupled to the transmissive phosphor plate 110 like that of FIG. 1B. Both the heat sink 112 and the temperature sensor 114 are identical to that of FIG. 1B and are positioned and coupled to the transmissive phosphor plate 110 in the same manner as FIG. 1B.

FIG. 3A is a schematic view of a luminaire 300, including the solid medium waveguide 215 with the wedge-shape positioned in between the laser light source 105 and a reflective phosphor plate 310. The reflective phosphor plate 310 includes a phosphor layer similar to the transmissive phosphor plate 110, but the phosphor layer is deposited on a reflective substrate. The reflective substrate underneath or behind the phosphor layer includes suitable metals (e.g., aluminum), metal oxides (e.g., aluminum oxide), or other reflective materials. For example, the reflective substrate is a white or mirrored surface so that any illumination lighting 136A-N passing through the phosphor layer is reflected back into the sold medium waveguide 215. A reflective substrate formed of aluminum oxide provides good thermal conduction and reflectively. Aluminum oxide is also generally whiter and does not have specular reflection properties, so if the phosphor layer degrades and the reflected shaped laser light rays 127A-N start striking the reflective substrate, very diffuse laser light is emitted instead of a highly coherent laser light beam. Diffuse laser light has much lower radiant intensity (i.e., optical watt per steradian) than the original collimated laser light and forms Lambertian-like emission, i.e. very similar with regular blue light emitting from light-emitting diodes and scatters everywhere, which provides enhanced safety. Input surface 120 can include an aspherical or spherical shape to shape incoming laser light rays 106A-N into collimated, partially collimated, or converged shaped laser light rays 121A-N utilizing the previously described techniques, for example, if a collimating lens 250 is not included.

The holographic reflective optical element 255 is coupled to an output surface 130 of the solid medium waveguide 215 and behaves as a reflective type hologram as is the case with FIG. 2A. Reflected shaped laser light rays 127A-N do not pass through the holographic reflective optical element 255, and are reflected back to the reflective phosphor plate 310. However, in FIG. 3A, holographic reflective optical element 255 also behaves as a transmissive type hologram, in which incident and diffracted illumination lighting 136A-N are on opposite sides of the holographic reflective optical element 255. The holographic reflective optical element 255 is wavelength dependent and polarization dependent. Illumination lighting 136A-N emitted from reflective phosphor plate 310 other than blue light, can pass through holographic reflective optical element 255 without too much influence due to its wavelength dependency. Thus, the holographic reflective optical element 255 is wavelength sensitive to selectively emit illumination lighting 136A-N reflected from the reflective phosphor plate 310 through the output surface 130 of the solid medium waveguide 215 and substantially exclude the reflected shaped laser light rays 127A-N from emission through the output surface 130 of the solid medium waveguide 215. As used herein, "substantially exclude" means 10% or less of the illumination lighting 136A-N includes unconverted light from the original pumping source (incoming laser light rays 106A-N), which is laser light source 105. Holographic reflective optical element 255 is not 100% reflective to blue light, but about 90% reflective. The blue light and yellow light that passes through holographic reflective optical element 255 becomes illumination lighting 136A-N.

The reflective substrate underneath the phosphor layer of the reflective phosphor plate 310 reflects back the illumination lighting 136A-N generated by the phosphor layer through the solid medium waveguide 215. Holographic reflective optical element 255 is very wavelength sensitive. Reflective phosphor plate 310 transforms most of the reflected shaped laser light rays 127A-N into illumination lighting 136A-N. Holographic reflective optical element 255 is transparent to white light, but blocks the narrow band blue light wavelength. Thus, the holographic reflective optical element 255 is utilized for safety so that if the phosphor layer of the reflective phosphor plate 310 degrades, laser light will not be observed by an observer of the luminaire 300. Holographic reflective optical element 255 also provides optical efficiency advantages because the reflective phosphor plate 310 generates illumination lighting 136A-N in many directions and the holographic reflective optical element 255 recycles virtually of the illumination lighting 136A-N out of the solid medium waveguide 215.

The holographic reflective optical element 255 lens has a very narrow band and only emits the narrow band illumination white light. The reflective phosphor plate 310 is broadband and absorbs all striking blue light (e.g., 445-465 nm), and then performs a Stokes shift to shift the blue light down. The holographic reflective optical element 255 can have a very tiny profile size because of the small laser light spot size, e.g., in the submillimeter range.

Figure 3B:
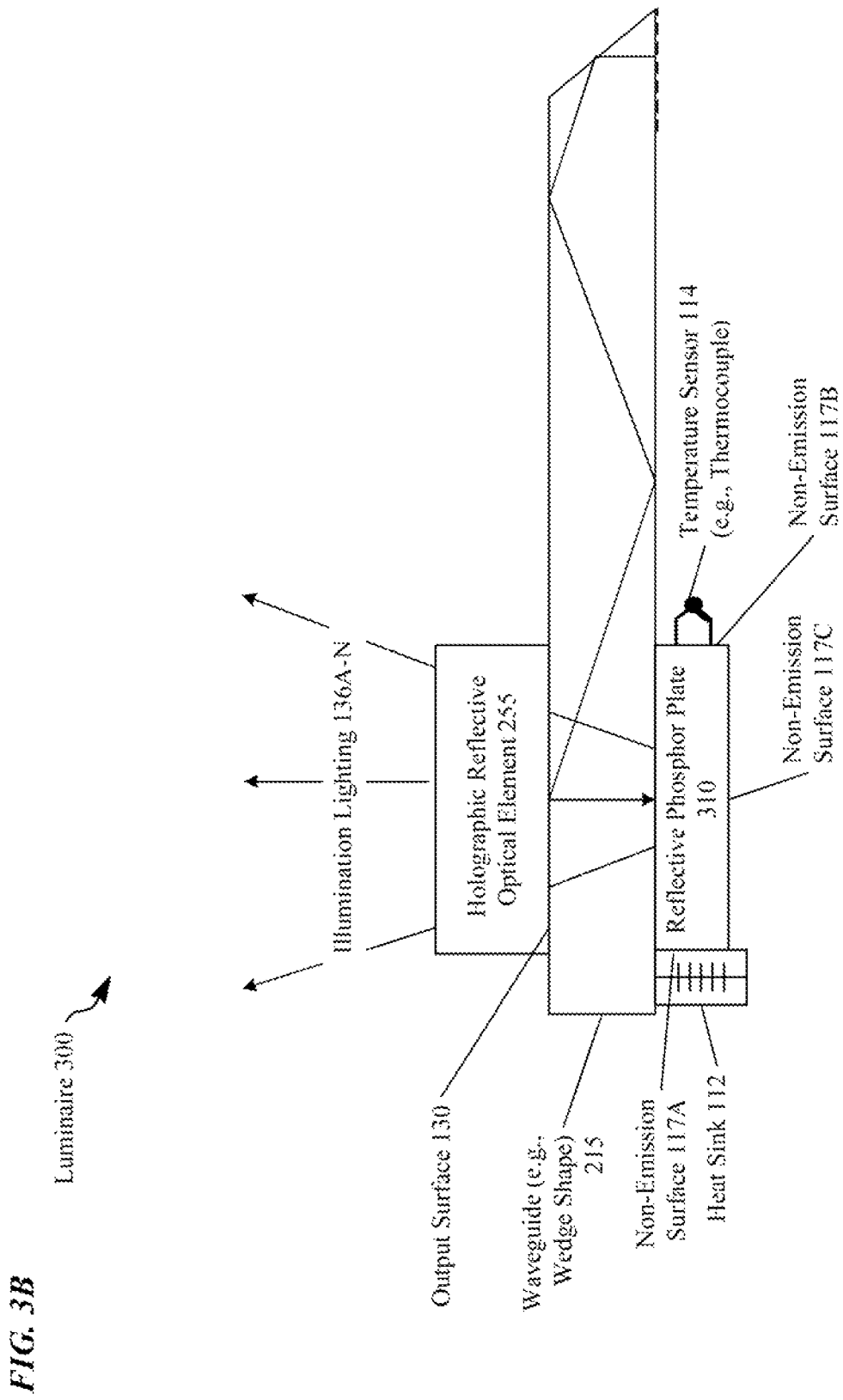
FIG. 3B is another schematic view of the luminaire of FIG. 3A with the heat sink and the temperature sensor coupled to the reflective phosphor plate.

FIG. 3B is another schematic view of the luminaire 300 of FIG. 3A with the heat sink 112 and the temperature sensor 114 coupled to the reflective phosphor plate 310 like that of FIG. 1B. Both the heat sink 112 and the temperature sensor 114 are identical to that of FIG. 1B and are positioned and coupled to the reflective phosphor plate 310 in the same manner as the positioning and coupling to the transmissive phosphor plate 110 of FIG. 1B.

Figure 3C:
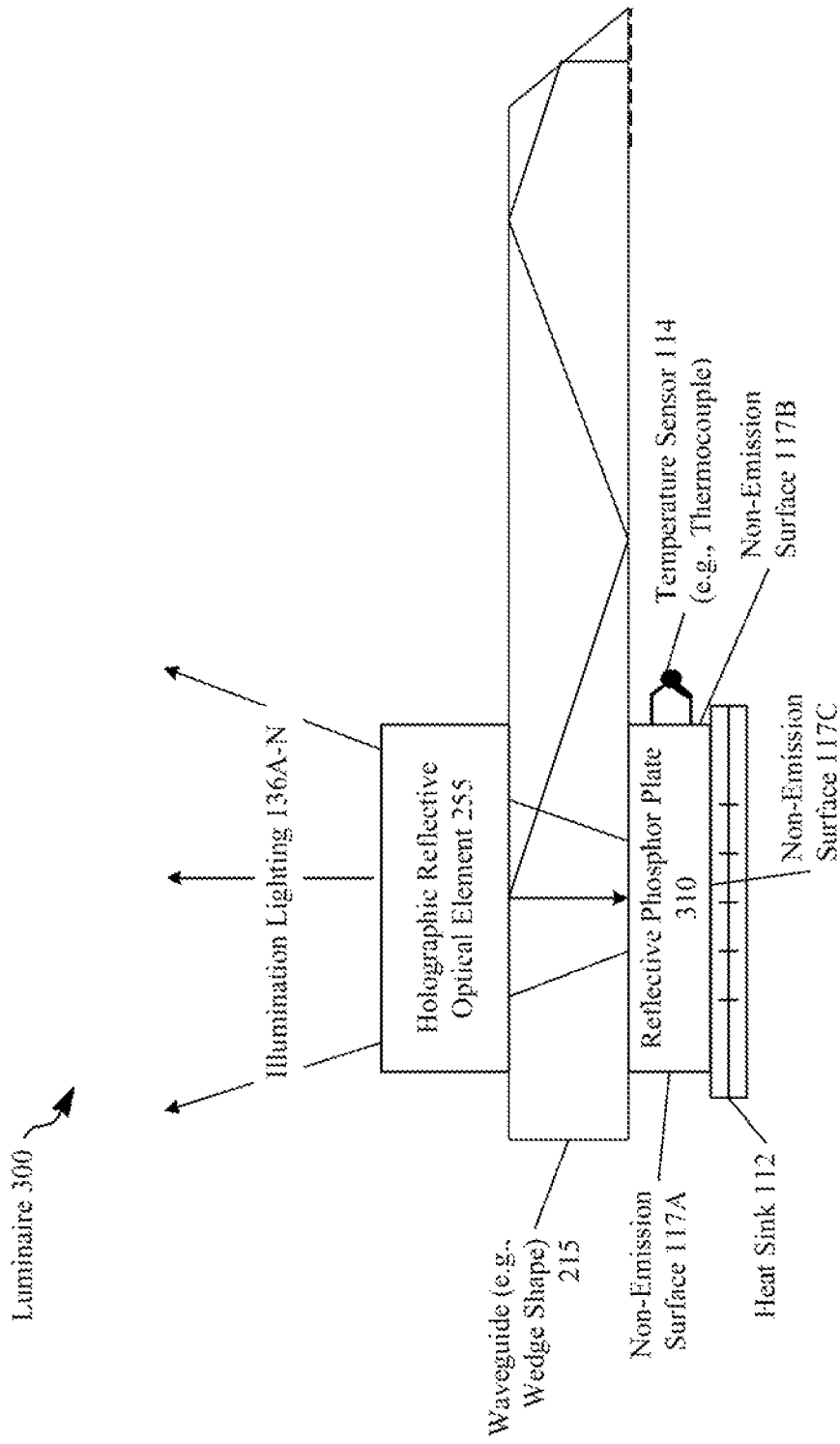
FIG. 3C is another schematic view of the luminaire of FIG. 3A with a different arrangement of the heat sink and the temperature sensor coupled to the reflective phosphor plate.

FIG. 3C is another schematic view of the luminaire 300 of FIG. 3A with a different arrangement of the heat sink 112 and the temperature sensor 114 coupled to the reflective phosphor plate 310. In the example luminaire 300 of FIG. 3C, the heat sink 112 is positioned on the bottom non-emission surface 117C of the reflective phosphor plate 310 (e.g., underneath the reflective substrate on the opposing side of the phosphor layer). Temperature sensor 114 is coupled to the side non-emission surface 117B of the reflective phosphor plate 310. Having a reflective phosphor plate 310 can be advantageous and allow maximization of the surface area of the heat sink 112 in contact with the air-cooling medium. The reflective phosphor plate 310 also prevents the heat sink 112 and temperature sensor 112 from blocking, obstructing, or interfering with any of the illumination lighting 136A-N emitted from the holographic reflective optical element 255. Non-emission surfaces 117A-C may be a single continuous surface instead of discontinuous surfaces. Heat sink 112 may be coupled to all of the non-emission surfaces 117A-C to maximize conduction and heat exchange with the air-cooling medium.

Because the reflective phosphor plate 310 can conduct heat from multiple non-emission surfaces 117A-C without interfering with the illumination lighting 136A-N, placement of the heat sink 112 is simplified. Reflective phosphor plate 310 can also provide higher optical efficiency because most of the produced illumination lighting 136A-N is outputted with a well-controlled beam pattern via manipulation of the holographic reflective optical element 255.

Reflective phosphor plate 310 has safety benefits compared to the transmissive phosphor plate 110 in the event of phosphor layer failure. In the event of failure of the transmissive phosphor plate 110 or the reflective phosphor plate 310, the conversion into illumination lighting 136A-N ceases. If the temperature sensor 114, phosphor monitoring control program 780, or other components that check for degradation of the transmissive phosphor plate 110 fail, then the reflected shaped laser light rays 127A-N shoot out of the luminaire 300, as shown in FIGS. 2A-B. However, if the temperature sensor 114, phosphor monitoring control program 780, or other components that check for degradation of the reflective phosphor plate 130 fail, then the reflected shaped laser light rays 127A-N are not observed outside of the luminaire 300. Instead, the reflected shaped laser light rays 127A-N shoot are merely absorbed as heat and can be exchanged with the air-cooling medium by the heat sink 112, as shown in FIGS. 3A-C.

FIG. 4A is a schematic view of a luminaire 400A, including a solid medium waveguide 415 positioned in between the laser light source 105 and the transmissive phosphor plate 110. Transmissive phosphor plate 110 is coupled to the output surface 130. The solid medium waveguide 415 is a rectangular shape and includes multiple holographic reflective optical elements 255A-B (two are shown in the example of FIG. 4A). As shown, holographic reflective optical element 255A reflects the shaped laser light rays 121A-N and holographic reflective optical element 255B reflects the reflected shaped laser light rays 127A-N.

As noted above, although depicted as having a planar surface, the input surface 120 may have an aspherical or spherical contour to shape (e.g., collimate, partially collimate, or converge) the incoming light rays 106A-N into shaped light rays 121A-N, as shown in FIG. 1A, particularly if a collimating lens 250 is not utilized. As noted above, placing the laser light source 105 at the focus of the convex aspherical or spherical shaped input surface 120 collimates incoming laser light rays 106A-N into shaped laser light rays 121A-N. Placing the laser light source 105 outside the focus of the aspherical or spherical shaped input surface 120 partially collimates or converges the incoming laser light rays 106A-N into shaped laser light rays 121A-N.

Both of the wedge-shaped solid medium waveguide 215 examples of FIGS. 2A and 3A are coupled to a single holographic reflective optical element 255. In the examples of FIGS. 4A and 5, a rectangular-shaped solid medium waveguide 415 is coupled to two holographic reflective optical elements 255A-B. The benefit of the wedge-shaped solid medium waveguide 215 is higher efficiency because a TIR type highly reflective internal surface 225 is highly efficient, but the wedge-shaped solid medium waveguide 215 is more difficult to manufacture. In contrast, manufacturing of the rectangular-shaped solid medium waveguide 415 is easier because a large rectangular solid medium can be cut into many such rectangular-shaped solid medium waveguides 415, but the rectangular-shaped solid medium waveguide 415 is less efficient because two holographic reflective optical elements 255A-B are present in the luminaires 400A, 500. Each of the two holographic reflective optical elements 255A-B are typically only 90% optically efficient because of light leakage, which is much less efficient than TIR. Although the wedge-shaped solid medium waveguide 215 requires a specific mold to manufacture, which leads to higher manufacturing costs, higher optical efficiency is achieved with just one holographic reflective optical element 255 and mostly TIR type reflection in the luminaires 200, 300.

In FIG. 4A, the initial highly reflective internal surface portion 226 of the highly reflective internal surface 225 includes a first holographic reflective optical element 255A to initially reflect the shaped laser light rays 121A-N to propagate inside the remainder of the solid medium waveguide 415. A different area of the highly reflective internal surface 225 of the solid medium waveguide 415, which excludes the area of the initial highly reflective internal surface portion 226, is coupled to a second holographic reflective optical element 255B. Second holographic reflective optical element 255B opposes the transmissive phosphor plate 110 and further reflects the propagating reflected collimating laser light rays 127A-N towards the transmissive phosphor plate 110.

Figure 4B:
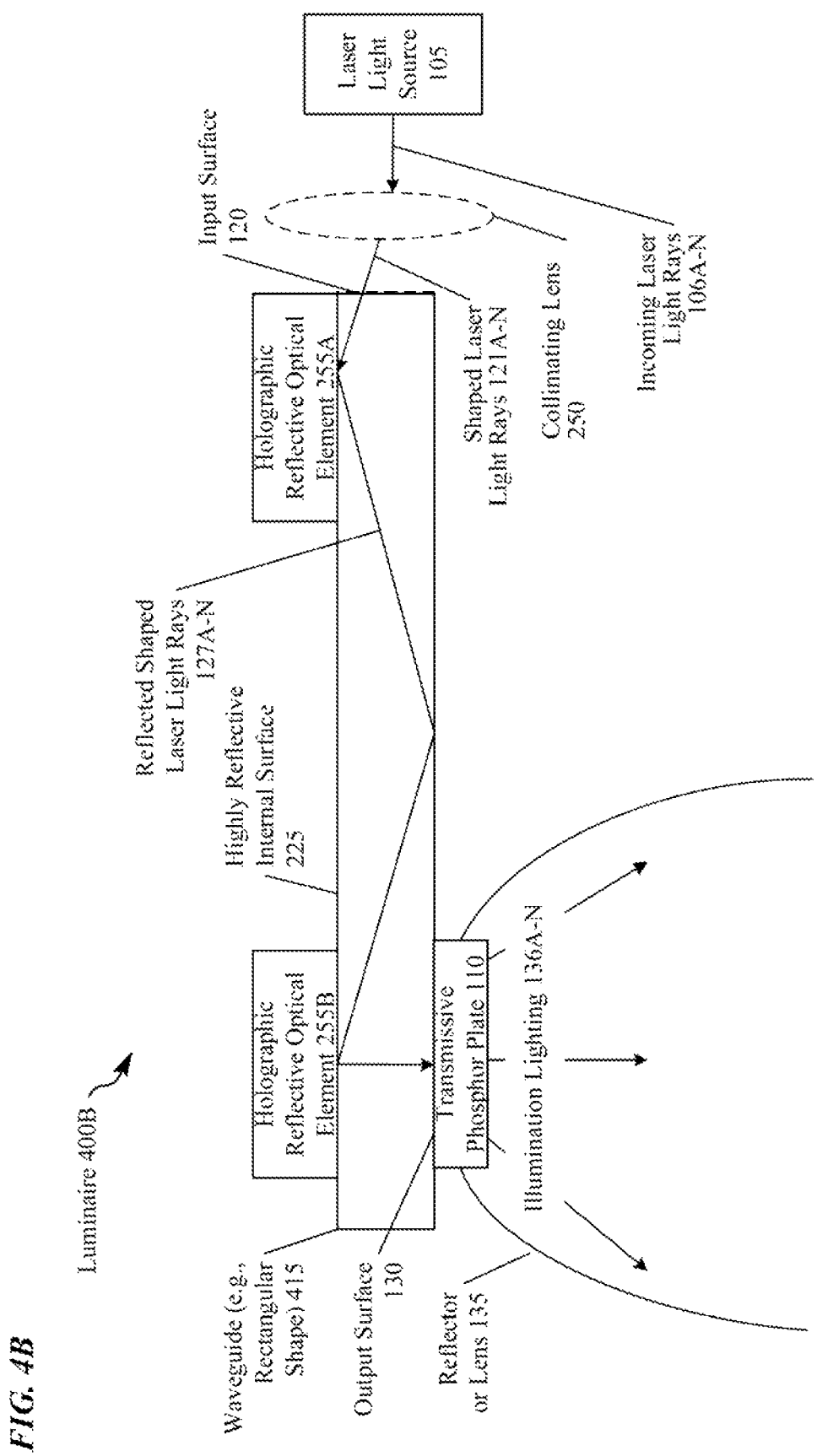
FIG. 4B is a schematic view of a luminaire, including a solid medium waveguide like that of FIG. 4A, but with a different arrangement of the laser light source coupled to an input surface of the solid medium waveguide.
Figure 5:
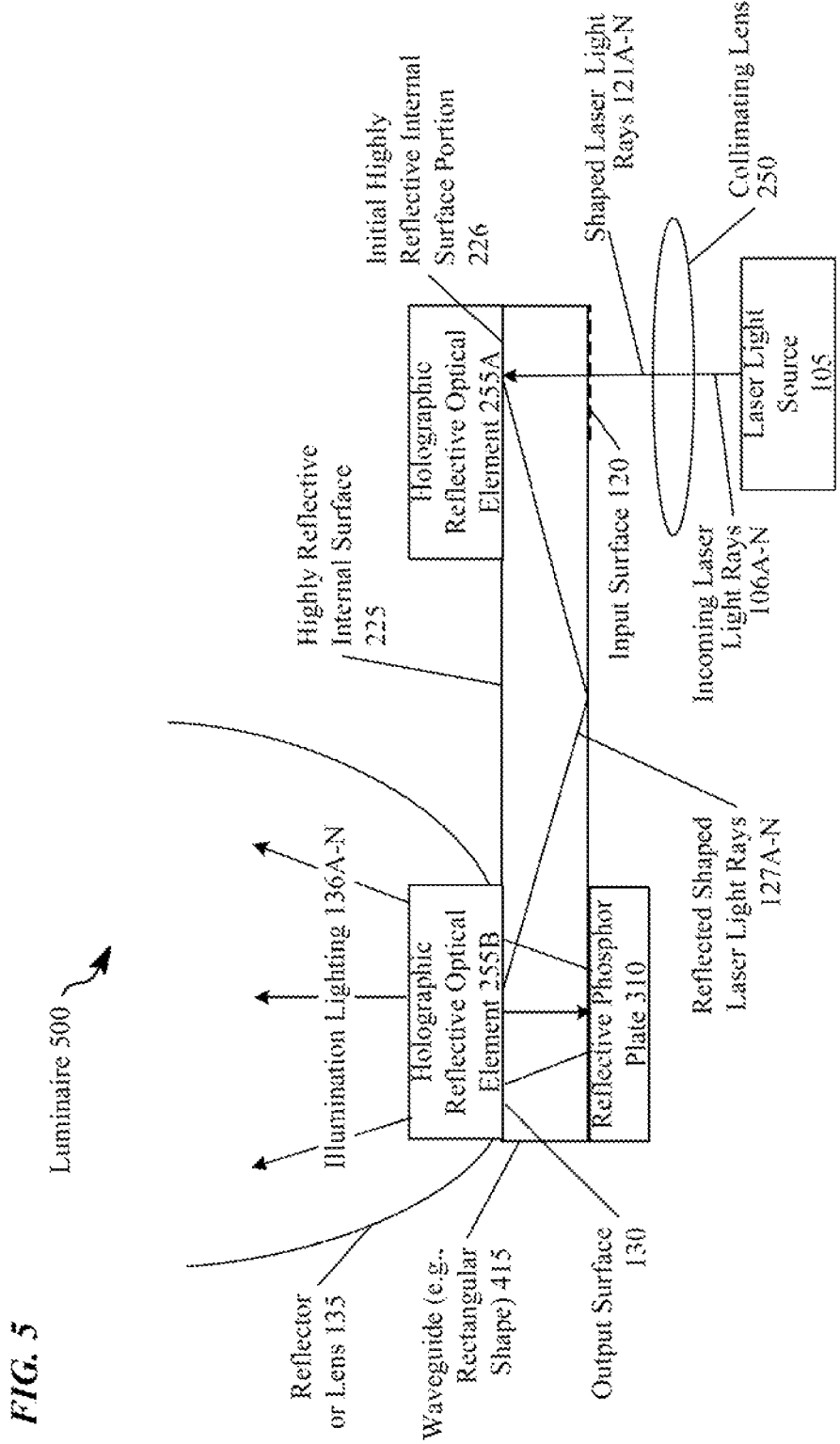
FIG. 5 is a schematic view of a luminaire, including the solid medium waveguide with the rectangular-shape positioned in between the laser light source and the reflective phosphor plate.

FIG. 4B is a schematic view of a luminaire 400B, including a solid medium waveguide 415 like that of FIG. 4A, but with a different arrangement of the laser light source 105 coupled to an input surface 120 of the solid medium waveguide 415. In this example, the input surface 120 is located on the lateral surface of the waveguide 415 and the luminaire 400B is edge lit by positioning the laser light source 105 adjacent that lateral surface where the input surface 120 of the waveguide 415 is located. A direction of the incoming laser light rays 106A-N entering the input surface 120 is rotated 45 degrees to 90 degrees relative to the direction of the illumination lighting 136A-N emitted from the transmissive phosphor plate 110.

FIG. 5 is a schematic view of a luminaire 500, including the solid medium waveguide 415 with the rectangular-shape positioned in between the laser light source 105 and the reflective phosphor plate 310. As shown, the output surface 130 is coupled to a holographic reflective optical element 255B, which is wavelength sensitive, to selectively emit the illumination lighting 136A-N emitted from the reflective phosphor plate 310 and substantially exclude the reflected shaped laser light rays 127A-N from emission through the output surface 130 of the solid medium waveguide 415. The luminaire 500 further includes a reflector or lens 135 coupled to the reflective phosphor plate 310 on the output surface 130 to shape a beam pattern of the emitted illumination lighting 136A-N. Input surface 120 can include an aspherical or spherical shape to shape incoming laser light rays 106A-N into collimated, partially collimated, or converged shaped laser light rays 121A-N utilizing the previously described techniques, for example, if a collimating lens 250 is not included.

Figure 6A:
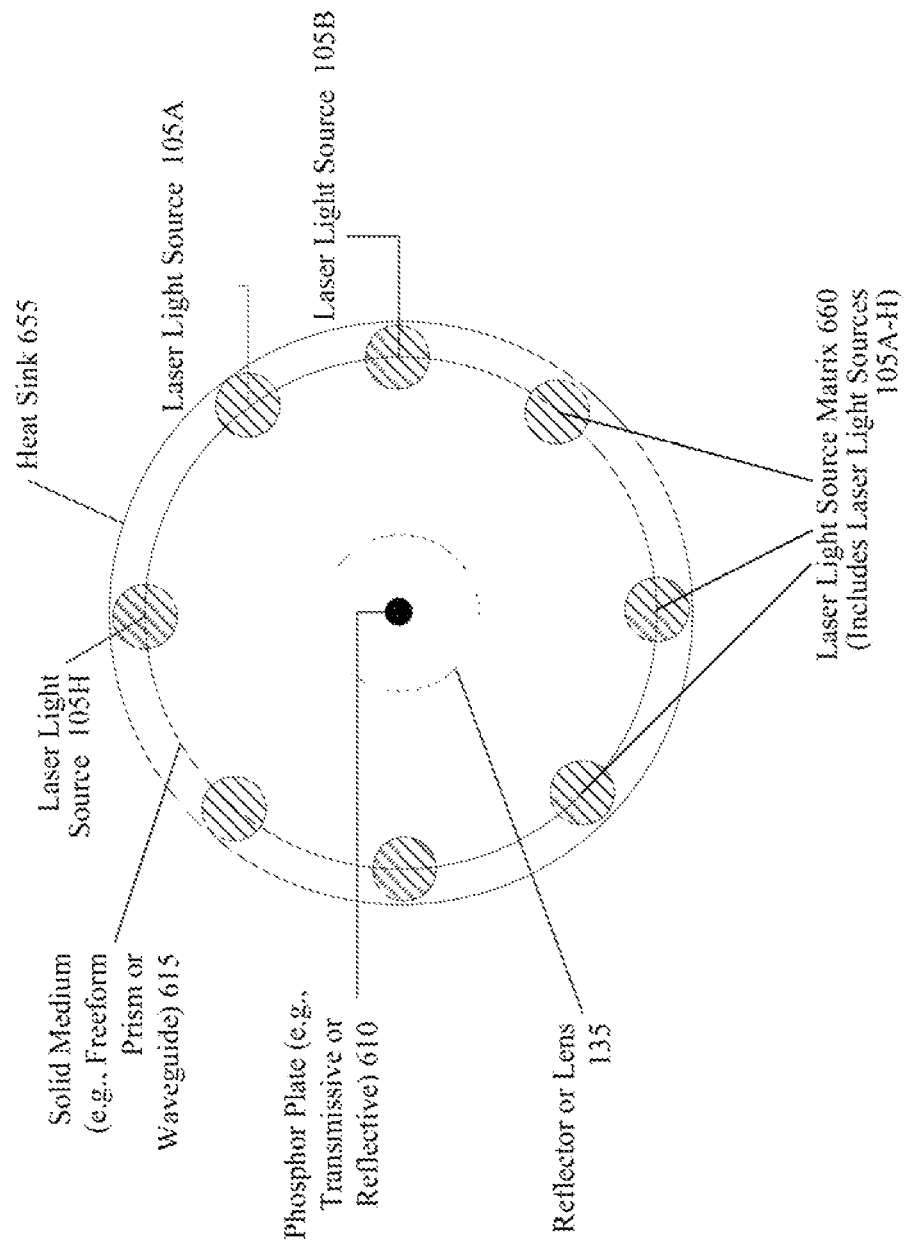
FIG. 6A is a top view of a luminaire, including the solid medium freeform prism or waveguide like that of FIGS. 1A-5 and a laser light source matrix.

FIG. 6A is a top view of a luminaire 600A, including the solid medium freeform prism or waveguide 615, like that of FIGS. 1A-5 and a laser light source matrix 660. Laser light source matrix 660 includes multiple laser light sources 105A-H, of which there are eighth in the example. Each of the laser light sources 105A-H is configured to be driven by electrical power to emit laser light rays. As shown, a heat sink 655 surrounds the luminaire 600A to heat exchange the heat generated from eighth laser light sources 105A-H and the phosphor plate 610 with an air-cooling medium. The reflector or lens 135 annularly surrounds the phosphor plate 610.

In an example, a subset or all of the laser light sources 105A-H in the laser light source matrix 660 emit laser light rays 106A-N, which enter into the solid medium freeform prism or waveguide 615. Solid medium freeform prism or waveguide 615 may be glass, acrylic, or silicon, but glass may be more reliable for the high power density of the incoming laser light rays 106A-N. Once the incoming laser light rays 106A-N are collimated, solid medium freeform prism or waveguide 615 directs the shaped laser light rays 121A-N to the phosphor plate 610. Luminaire 600A may include a secondary optic, such as the reflector or lens 135 to obtain different light distributions and beam patterns.

In one example, when the solid medium is a freeform prism, the freeform prism has a collimating ability and several different surfaces, including a collimating input 120 surface to collimate the laser light rays so that once the laser light rays 106A-N enter the freeform prism, the freeform prism behaves as a waveguide. In another example, when the solid medium is a waveguide, the input surface 120 of the waveguide is integrated into the waveguide to avoid the cost of a collimating lens 250. The collimating lens 250 is shaped as a section of a sphere or a conic surface. An antireflective coating is deposited or layered on the input surface 120 or lens 250 of the solid medium freeform prism or waveguide 615.

Figure 6B:
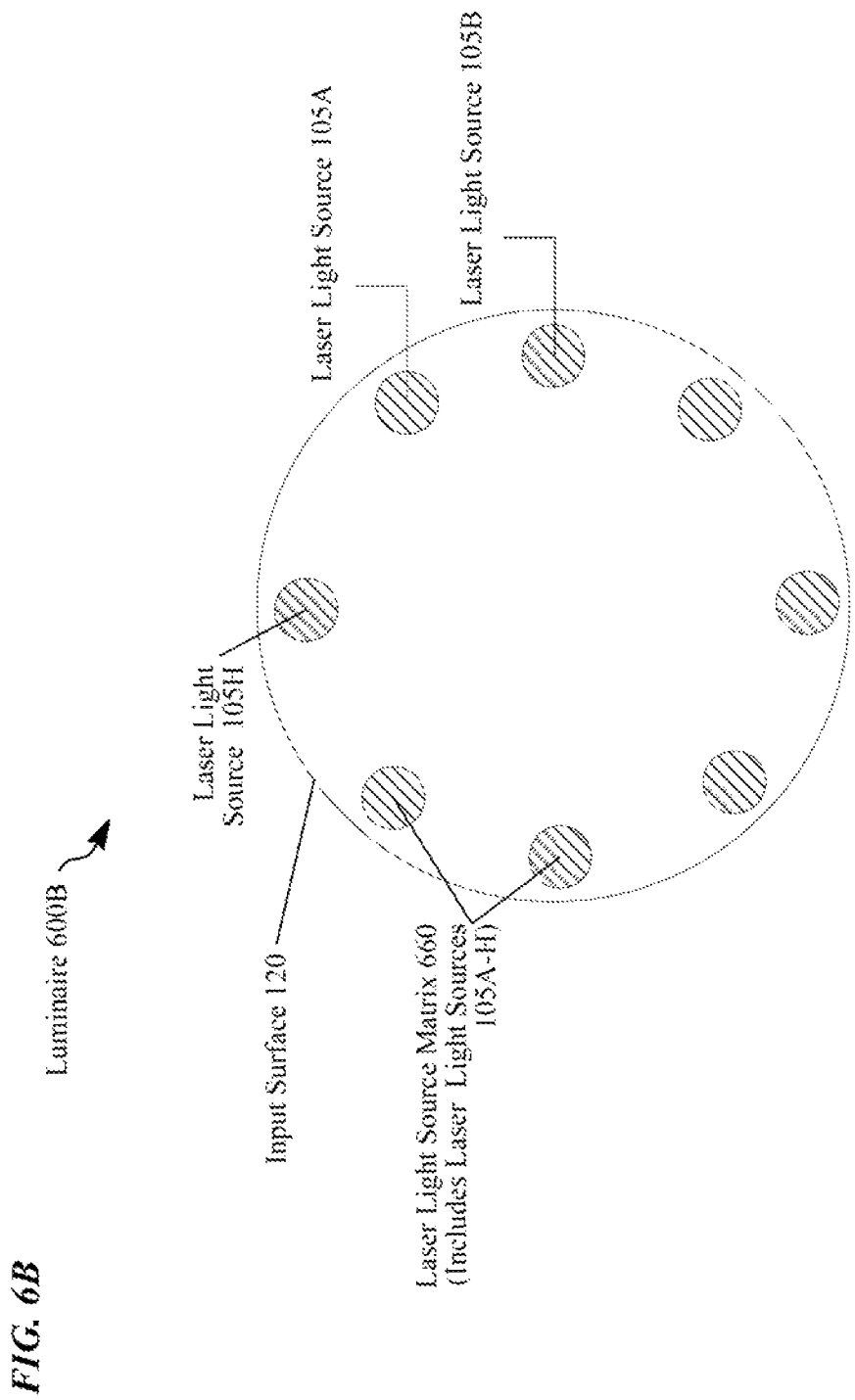
FIG. 6B is a bottom view of a luminaire, including the solid medium freeform prism or waveguide like that of FIGS. 1A-5 and the laser light source matrix aimed at an input surface of the solid medium freeform prism or waveguide.

FIG. 6B is a bottom view of a luminaire 600B, including the solid medium freeform prism or waveguide 615 like that of FIGS. 1A-5 and the laser light source matrix 660. Laser light source matrix 660 is coupled to the input surface 120 of the solid medium freeform prism or waveguide 615. The laser light source matrix 660 is coupled directly or indirectly to the input surface 120 without an air gap for improved safety, however, in some examples, an air gap may exist. As shown, the laser light sources 105A-H of the laser light source matrix 660 are annularly arranged around the input surface 120.

Hence, the laser light rays 106A-N emitted by the laser light source matrix 660 are aimed at the input surface 120 of the solid medium freeform prism or waveguide 615. The multiple laser light sources 105A-H are in different locations of the laser light source matrix 660 to emit the laser light rays 106A-N directed towards the input surface 129. In the example, the multiple laser light sources 105A-H are arranged in a ring, for example, in a circular or oval shaped array; however, in some examples, the multiple laser light sources 105A-H may be arranged as a rectangular or square grid or as two or more concentric rings.

Figure 6C:
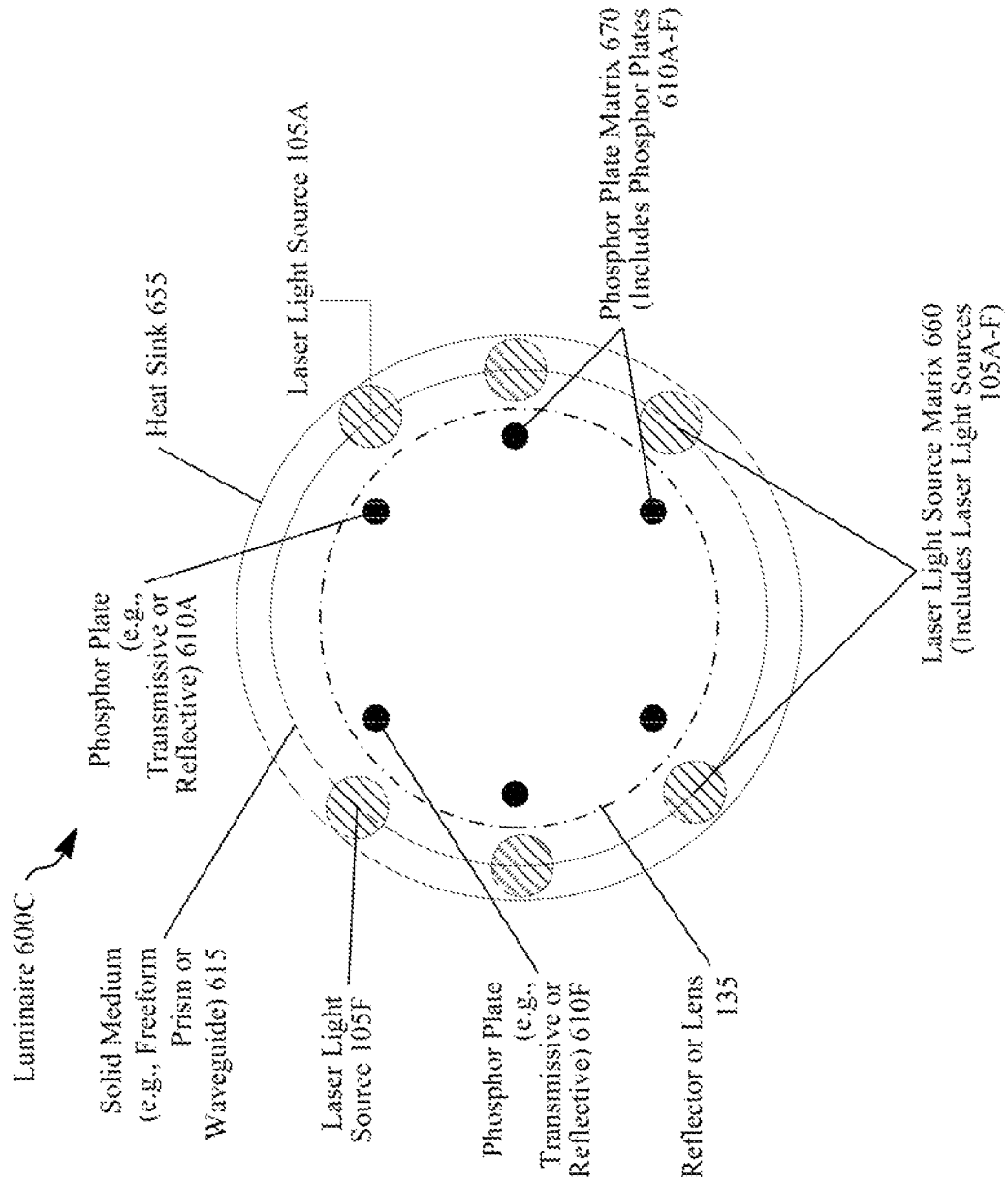
FIG. 6C is another top view of a luminaire, including the solid medium freeform prism or waveguide like that of FIGS. 1A-5, another laser light source matrix, and a phosphor plate matrix.

FIG. 6C is another top view of a luminaire 600C, including the solid medium freeform prism or waveguide 615 like that of FIGS. 1A-5. In the example of FIG. 6C, the luminaire 600C includes a laser light source matrix 660 with six laser light sources 105A-F positioned to form a hexagon shape. The luminaire 600C further includes a phosphor plate matrix 670 with six phosphor plates 610A-F (e.g., transmissive or reflective) positioned to form a hexagon shape. Each of the laser light sources 105A-F is optically coupled through the freeform prism or waveguide 615 to a corresponding phosphor plate 610A-F in the phosphor plate matrix 670. The polygon shape of the phosphor plate matrix 670 may vary depending on the number of phosphor plates 610A-N and the polygon shape of the laser light source matrix 660 may vary depending on the number of laser light sources 105A-F, for example, shaped like a triangle, rectangle, pentagon, octagon, etc.

FIG. 7 is a functional block diagram of an example of a lighting device or system 709 in which a luminaire 700 includes a laser light source 105 or matrix 660, a solid medium freeform prism or waveguide 615, and a phosphor plate 710. The depicted components of the luminaire 700 may be coupled without air gaps. The drawing (FIG. 7) shows the inclusion of the luminaire 700 in a system 709, together with a suitable controller 711. As shown in FIG. 7, the controller 711 includes a laser light source driver 713 coupled to the luminaire 700 and a host processing system 716. The controller 711 may also include one or more communication interfaces 717 and one or more sensors 726.

Luminaire 700 provides illumination lighting in response to lighting control signals received from the driver system, shown as laser light source driver 713, for example, based on an illumination application (stored as program(s) 727). Laser light source driver 713 selectively controls the laser light source 105 or matrix 660 to emit the laser light rays 106A-N for conversion into artificial illumination lighting. Laser light source driver 713 is configured and coupled to supply suitable power to drive the particular implementation of the laser light source 105 or matrix 660. The illumination lighting 136A-N emitted from the luminaire 700 has an intensity and/or other characteristic(s) that satisfy an industry acceptable performance standard for a general lighting application.

In an example, the luminaire 700 includes a laser light source 105 or matrix 660, which emits incoming laser light rays 106A-N. The laser light source 105 or matrix 660 are coupled directly or indirectly to the input surface 120 of the solid medium freeform prism or waveguide 615, for example, without an air gap. As described above, the laser light source matrix 660 is comprised of multiple laser light sources. In the example, the luminaire 700 further includes an optional input surface or lens 750 coupled to the laser light source 105 or matrix 660 for incoming laser light rays 106A-N emitted by the laser light source 105 or matrix 600. Input surface or lens 750 collimates, partially collimates, or converges the incoming laser light rays 106A-N passing through and entering inside the solid medium waveguide freeform prism or waveguide 615 into shaped laser light rays 121A-N via refraction. As noted above, input surface or lens 750 may be an input surface 120 formed integrally as part of the solid freeform prism or waveguide 615. Alternatively, input surface or lens 750 may be a collimating lens 250 that is separately formed from the solid freeform prism or waveguide 615, as shown in the example of FIG. 7. The solid medium freeform prism or waveguide 615 confines (e.g., traps) and then transports the shaped laser light rays 121A-N inside the solid medium freeform prism or waveguide 615 until conversion into illumination lighting 136A-N by the phosphor plate 710. In addition, the luminaire may include various holographic reflective optical elements 255 like the luminaire arrangements described in FIGS. 2A, 3A, 4A, and 5. Although not shown, the solid medium freeform prism or waveguide 615 includes an output surface 130, a highly reflective internal surface 125, 225 to reflect the shaped laser light rays 121A-N to propagate inside the solid medium freeform prism or waveguide 615 until emission through the output surface 130. Output surface 130 emits the reflected shaped laser light rays 127A-N to the phosphor plate 710.

As described earlier, the phosphor plate 710 can be transmissive or reflective. Phosphor plate 710 is coupled to the output surface 130 of the solid medium freeform prism or waveguide 615 to convert the reflected shaped laser light rays 127A-N into the illumination lighting 136A-N to emit from the luminaire 700.

FIG. 7 also provides an example of an implementation of the high layer logic and communications elements to control luminaire operations to provide selected illumination light, e.g., for a general illumination application. As shown, the controller 711 includes a host processing system 716, one or more sensors 726 and one or more communication interface(s) 717. Other implementations of the circuitry of the controller 711 may be utilized. For the purpose of illumination operation, the circuitry of the controller 711, in the example, is coupled to the laser light source 105 or matrix 660 to drive and control operation of the laser light source 105 or matrix 660. The circuitry of the controller 711 may be configured to operate the laser light source 105 or matrix 660 to generate the illumination light at least during an illumination state of the luminaire 700. The controller 711 may implement a number of different illumination state configurations (e.g., on/off and dimming levels)

The host processing system 716 provides the high level logic or "brain" of the controller 711 and thus of the lighting device or system 709. In the example, the host processing system 716 includes memories/storage 725, such as a random access memory and/or a read-only memory, as well as programs 727 stored in one or more of the memories/storage 725. The programming 727, in one example, configures the lighting device or system 709 to implement illumination states of the controlled luminaire 700. As an alternative to distinct states, the programming 727 may configure the lighting device or system 709 to implement a step-wise or substantially continuous adjustment of the relative intensities of the illumination light outputs of the controlled luminaire 700, encompassing settings to achieve the relative intensity levels of the states.

The memories/storage 725 may also store various data, including luminaire configuration information 728 or one or more configuration files containing such information, in addition to the illustrated programming 727. The host processing system 716 also includes a central processing unit (CPU), shown by way of example as a microprocessor (µP) 723, although other processor hardware may serve as the CPU.

As shown, one of the programs 727 is a phosphor monitoring control program 780 and one of the sensor(s) 726 is the temperature sensor 114. Execution of the phosphor monitoring program 780 in the memory 725 by the microprocessor 723 configures the lighting device or system 709 to perform various functions described herein. The temperature sensor 114 coupled to the phosphor plate 710 produces a temperature measurement, shown as temperature feedback input, which is based on a temperature-dependent voltage output of the phosphor plate 710. Microprocessor 723 receives the temperature feedback input based on the produced temperature-dependent voltage output of the temperature sensor 114 and stores the temperature feedback input in the memory 725. In response to detecting that the temperature feedback input exceeds a temperature threshold (e.g., constant or adjustable setting stored in the memory 725), the microprocessor 723 causes the laser light source driver 713 to turn off the laser light source 105 or matrix 660 of the luminaire 700. Microprocessor 723 constantly monitors temperature of the phosphor plate 710 at predetermined time intervals to prevent overheating or premature burnout of the phosphor plate 710 of the luminaire 700. Thus, the microprocessor 723 constantly receives updates to the temperature feedback input from temperature sensor 114 and temporarily turns off the laser light source 105 or matrix 660 during overheating. Once microprocessor 723 detects that the temperature feedback input is below the temperature threshold, the microprocessor 723 enables the laser light source driver 713 to turn on the laser light source 105 or matrix 660 of the luminaire 700 once again, if that is the desired illumination lighting state setting.

As shown, the microprocessor 723 produces an input drive signal, which is conveyed to the laser light source driver 713 to ultimately switch the laser light source 105 or matrix 660 on/off or set a dim level. The laser light source driver 713 produces an output drive signal, which switches the laser light source 105 or matrix 660 on/off or sets a dim level based on the input drive signal. As further shown, in some examples, for high safety levels, the microprocessor 723 sets a disable setting signal once the temperature feedback input exceeds the temperature threshold to halt the luminaire 700 from operating on a more permanent basis. The disable setting signal is a flag, variable, or other setting stored in the configuration data/file(s) 728, which permanently disables the luminaire 100 once the temperature feedback input of the phosphor plate 710 exceeds the temperature threshold. Each time the user attempts to operate the luminaire 700, the microprocessor 723 checks if the setting of the disable setting signal is switched on and, if so, stops the luminaire 700 from outputting any light. If the phosphor plate 710 is replaced by an operator (e.g., service technician or user), then that operator can utilize the microprocessor 723 via the phosphor monitoring control program 780 to switch the disable setting signal back to off.

The ports and/or interfaces 729 couple the processor 723 to various elements of the lighting device or system 709 logically outside the host processing system 716, such as the laser light source driver 713, the communication interface(s) 717 and the sensor(s) 726. For example, the processor 723 by accessing programming 727 in the memory 725 controls operation of the laser light source driver 713 and thus operations of the luminaire 700 via one or more of the ports and/or interfaces 729. In a similar fashion, one or more of the ports and/or interfaces 729 enable the processor 723 of the host processing system 716 to use and communicate externally via the communication interface(s) 717; and the one or more of the ports 729 enable the processor 723 of the host processing system 716 to receive data regarding any condition detected by a sensor 726, such as temperature sensor 114 for further processing.

In the operational examples, based on its programming 727, the processor 723 processes data retrieved from the memory 725 and/or other data storage, and responds to light output parameters in the retrieved data to control the light generation by the luminaire 700, particularly the laser light source 105 or matrix 660. The light output control also may be responsive to sensor data from a sensor 726. The light output parameters may include light intensity and light color characteristics of light from light sources. The light output parameters may also control modulation of the light output, e.g., to carry information on the illumination light output of the luminaire 700.

As noted, the host processing system 716 is coupled to the communication interface(s) 717. In the example, the communication interface(s) 717 offer a user interface function to interact with the phosphor monitoring control program 780 to switch the disable setting signal back to off after the user replaces a degraded phosphor plate 710, or communication with hardware elements providing a user interface for the system 709. The communication interface(s) 717 may communicate with other control elements, for example, a host computer of a building control and automation system (BCAS). The communication interface(s) 717 may also support device communication with a variety of other equipment of other parties having access to the lighting device or system 709 in an overall/networked lighting system encompassing a number of lighting devices or systems 709, e.g., for access to each lighting device or system 709 by equipment of a manufacturer for maintenance or access to an on-line server for downloading of programming instruction or configuration data for setting aspects of luminaire operation.

As outlined earlier, the host processing system 716 also is coupled to the laser light source driver 713. The laser light source driver 713 is coupled to the laser light source 105 or matrix 660. Laser light source driver 713 may be a single integral unit or implemented in a variety of different configurations having any number of internal driver units. The separate drivers may be circuits configured to provide signals appropriate to the respective type of laser light source 105 or matrix 660 utilized in the particular implementation of the luminaire 700, albeit in response to commands or control signals or the like from the host processing system 716.

The host processing system 716 and the laser light source driver 713 provide a number of control functions for controlling operation of the luminaire 700, including in the illumination states. In a typical example, execution of the programming 727 by the host processing system 716 and associated control via the laser light source driver 713 configures the luminaire 700 to perform functions, including functions to operate the laser light source 105 or matrix 660 to provide light output from the lighting device or system 709, e.g., based on the lighting device configuration information 728.

In an example of the operation of the luminaire 700, the processor 723 receives a configuration file 728 via one or more of communication interfaces 717. For illumination control, the configuration information in the configuration file 728 may specify operational parameters of the luminaire 700, such as light intensity, light color characteristic, and the like for light from the laser light source 105 or matrix 660. Configuration file 728 may also specify which of the laser light sources in the laser light source matrix 660 to turn off, on, or dim (e.g., outer, inner, middle, left, right) along with light intensity and color setting to achieve particular beam angles and lighting distributions via the solid medium freeform prism or waveguide 615. The processor 723 by accessing programming 727 and using software configuration information 728, from the storage/memories 725, controls operation of the laser light source driver 713, and through that driver 713 controls the laser light source 105 or matrix 660, e.g., to achieve a predetermined illumination light output intensity and/or color characteristic for a general illumination application of the luminaire 700, including settings for the laser light source 105 or matrix 660 appropriate to the current one of the luminaire states.

A software configurable lighting device or system such as 700 may be reconfigured, e.g., to change one or more parameters of the illumination light output, by changing the corresponding aspect(s) of the configuration data file 728, by replacing the configuration data file 728, or by selecting a different file from among a number of such files already stored in the data storage/memories 725.

In other examples, the lighting device or system 709 may be programmed to transmit information on the light output from the luminaire 700. Examples of information that the lighting device or system 709 may transmit in this way include a code, e.g., to identify the luminaire 700 and/or the lighting device or system 709 or to identify the luminaire location. Alternatively or in addition, the light output from the luminaire 700 may carry downstream transmission of communication signaling and/or user data. The information or data transmission may involve adjusting or modulating parameters (e.g., intensity, color characteristic or the like) of the illumination light output of the luminaire 700. Alternatively, user data may be received via one of the communication interface(s) 717 and processed in the controller 711 to transmit such received user data via light output from the luminaire 700.

Although specially configured circuitry may be used in place of microprocessor 723 and/or the entire host processing system 716, the drawing depicts an example of the controller 711 in which functions relating to the controlled operation of the lighting device or system 709, including operation of the luminaire 700, may be implemented by the programming 727 and/or configuration data 728 stored in a memory device 725 for execution by the microprocessor 723. The programming 727 and/or data 728 configure the processor 723 to control system operations so as to implement functions of the system 709 described herein.

Aspects of the software configurable lighting device or system 709 example therefore include "products" or "articles of manufacture" typically in the form of software or firmware that include executable code of programming 727 and/or associated configuration data 728 that is/are carried on or embodied in a type of machine readable medium. For example, programming code could include code for phosphor monitoring control program 780 to temporarily switch off or permanently disable the luminaire 700 during burnout of the phosphor layer of the phosphor plate 710. Until the luminaire 700 is serviced by a technician, the luminaire 700 is stopped from outputting laser light rays to an observer of the luminaire 700. "Storage" type media include any or all of storage devices that may be used to implement the memory 725, any tangible memory of computers or the like that may communicate with the lighting device or system 709 or associated modules of such other equipment. Examples of storage media include but are not limited to various semiconductor memories, tape drives, disk drives and the like, which may provide non-transitory storage at any time for the software or firmware programming 727 and/or the configuration data 728. All or portions of the programming and/or data may at times be communicated through the Internet or various other telecommunication networks. Such communications, for example, may enable loading of the programming and/or data from a computer or the like into the host processing system 716 of the controller 711, for example, from a management server or host computer of the lighting system service provider into a lighting device or system 709. Thus, another type of media that may bear the programming 727 and/or the data 728 includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

Apparatuses implementing functions like those of configurable lighting device or system 709 may take various forms. In some examples, some components attributed to the lighting device or system 709 may be separated from the luminaire 700. For example, a lighting device or system 709 may have all of the above hardware components on or within a single hardware platform as shown in FIG. 7 or in different somewhat separate units. In a particular example, one set of the hardware components may be separated from one or more instances of the controllable luminaire 700, e.g., such that one host processing system 716 may run several luminaires 700 each at a somewhat separate location wherein one or more of the luminaires 700 are at a location remote from the one host processing system 716. In such an example, a laser light source driver 713 may be located near or included in a combined platform with each luminaire 700. For example, one set of intelligent components, such as the microprocessor 723, may control/drive some number of driver systems 713 and associated controllable luminaires 700. Alternatively, there may be one overall laser light source driver 713 located at or near the host processing system 716 for driving some number of luminaires 700. It also is envisioned that some lighting devices may not include or be coupled to all of the illustrated elements, such as the sensor(s) 726 and the communication interface(s) 717. For convenience, further discussion of the lighting device or system 709 of FIG. 7 will assume an intelligent implementation of the lighting device or system 709 that includes at least the illustrated components.

In the previous examples, one or more electrical-to-optical transducers are included (e.g., laser light source 105 or matrix 660) in the luminaires, in which electrical power is used to emit light. The electrical-to-optical transducers are coupled to a driver, such as laser light source driver 713, to selectively control the electrical-to-optical transducers to emit the light rays. Various optical-to-electrical transducers that are light emitters or point light sources can be utilized in the luminaires 100A-B, 200, 300, 400A-B, 500, 600A-B, 700, in which the emitted light may be in the visible spectrum or in other wavelength ranges, such as infrared or near-infrared. Suitable light generation sources for use include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

In addition, the luminaire 700 of each lighting device or system 709 is not size restricted. For example, each luminaire 700 may be of a standard size, e.g. 2-feet by 2-feet (2×2), 2-feet by 4-feet (2×4), or the like, and arranged like tiles for larger area coverage. Alternatively, one luminaire 700 may be a larger area device that covers a wall, a part of a wall, part of a ceiling, an entire ceiling, or some combination of portions or all of a ceiling and wall.

Any of the phosphor degradation monitoring and temperature feedback input functions described herein for the luminaire 700 and lighting device or system 709 can be embodied in on one or more methods as method steps or in one more programs, like phosphor monitoring control program 780, as described previously. According to some embodiments, program(s) execute functions defined in the program, such as logic embodied in software or hardware instructions. Various programming languages can be employed to create one or more of the applications, structured in a variety of manners, such firmware, procedural programming languages (e.g., C or assembly language), or object-oriented programming languages (e.g., Objective-C, Java, or C++). The program(s) can invoke API calls provided by the operating system to facilitate functionality described herein. The programs can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device comprising:
a luminaire comprising:
 a laser light source configured to be driven by electrical power to emit laser light rays;
 a phosphor plate; and
 a solid medium freeform prism or waveguide to confine incoming laser light rays emitted from the laser light source inside the solid medium freeform prism or waveguide until conversion into illumination lighting by the phosphor plate, the solid medium freeform prism or waveguide including:
  an input surface or lens coupled to the laser light source to shape the incoming laser light rays passing through and entering inside the solid medium waveguide freeform prism or waveguide into shaped laser light rays;
  an output surface;
  a highly reflective internal surface to reflect the shaped laser light rays to propagate inside the solid medium freeform prism or waveguide until emission through the output surface; and
  wherein the output surface emits the reflected shaped laser light rays to the phosphor plate;
 wherein the phosphor plate is coupled to the output surface of the solid medium freeform prism or waveguide to convert the reflected shaped laser light rays into the illumination lighting to emit from the luminaire; and
a laser light source driver coupled to the laser light source to selectively control the laser light source to emit the laser light rays.

2. A lighting device comprising:
a luminaire comprising:
 a laser light source configured to be driven by electrical power to emit laser light rays;
 a phosphor plate; and
 a solid medium freeform prism to confine incoming laser light rays emitted from the laser light source inside the solid medium freeform prism until conversion into illumination lighting by the phosphor plate, the solid medium freeform prism including:
  an input surface coupled to the laser light source to shape the incoming laser light rays passing through and entering inside the solid medium freeform prism into shaped laser light rays;
  an output surface;
  a highly reflective internal surface to reflect the shaped laser light rays to propagate inside the solid medium freeform prism until emission through the output surface; and
  wherein the output surface emits the shaped laser light rays to the phosphor plate;
 wherein the phosphor plate is coupled to the output surface of the solid medium freeform prism to convert the reflected shaped laser light rays into the illumination lighting to emit from the luminaire; and
a laser light source driver coupled to the laser light source to selectively control the laser light source to emit the laser light rays.

3. The lighting device of claim 2, wherein:
the phosphor plate is a transmissive coating or layer deposited directly or indirectly on the output surface;
the luminaire further includes a reflector or lens coupled to the phosphor plate on the output surface to shape a beam pattern of the emitted illumination lighting;
the input surface is an aspherical or spherical shape and includes a first antireflective coating;
the input surface and the laser light source are coupled together without an air gap in between;
the highly reflective internal surface is a half TIR lens shape; and
the output surface includes a second antireflective coating.

4. A lighting device comprising:
a luminaire comprising:
 a laser light source configured to be driven by electrical power to emit laser light rays;
 a phosphor plate;
 a solid medium waveguide to confine incoming laser light rays emitted from the laser light source inside the solid medium waveguide until conversion into illumination lighting by the phosphor plate, the solid medium waveguide including:
  an input surface coupled to the laser light source for incoming laser light rays emitted by the laser light source to enter the solid medium waveguide;
  an output surface; and
  a highly reflective internal surface to steer the laser light rays passing through the solid medium waveguide to the phosphor plate, the highly reflective internal surface including an initial highly reflective internal surface portion to initially reflect the laser light rays to propagate inside a remainder the solid medium waveguide;
 wherein the phosphor plate is coupled to the solid medium waveguide to convert the reflected laser light rays into the illumination lighting; and a laser light source driver coupled to the laser light source to selectively control the laser light source to emit the laser light rays.

5. The lighting device of claim 4, wherein:
the input surface is in an optical path between the laser light source and the initial highly reflective internal surface portion;
the input surface includes an aspherical or spherical shape to collimate the incoming laser light rays emitted by the laser light source passing through and entering inside the solid medium waveguide into collimated laser light rays prior to striking the initial highly reflective internal surface portion; and
the input surface and the laser light source are coupled together without an air gap in between.

6. The lighting device of claim 4, wherein the luminaire further comprises:
a collimating lens in an optical path between laser light source and the input surface to collimate the incoming laser light rays emitted by the laser light source passing through and entering inside the solid medium freeform waveguide into collimated laser light rays prior to striking the input surface.

7. The lighting device of claim 4, wherein the input surface includes an antireflective coating.

8. The lighting device of claim 4, wherein:
the solid medium waveguide is formed of acrylic, glass, silicone, fused silica, or a combination thereof;
the initial highly reflective internal surface portion includes a total internal reflection (TIR) shape; and
the highly reflective internal surface includes at least one highly reflective optical coating or layer.

9. The lighting device of claim 8, wherein the at least one highly reflective optical coating or layer includes a dichroic film, a silvered mirror, or a combination thereof.

10. The lighting device of claim 4, wherein the solid medium waveguide is a wedge shape and the initial highly reflective internal surface portion includes a tapered surface of the wedge shape to initially reflect the laser light rays to propagate inside the remainder of the solid medium waveguide.

11. The lighting device of claim 4, wherein:
the luminaire further comprises a holographic reflective optical element coupled to the output surface of the solid medium waveguide;
the phosphor plate includes a phosphor layer deposited on a reflective substrate; and
the holographic reflective optical element is wavelength sensitive to selectively emit illumination lighting reflected from the phosphor plate through the output surface of the solid medium waveguide and substantially exclude the reflected laser light rays from emission through the output surface of the solid medium waveguide.

12. The lighting device of claim 11, wherein:
the phosphor layer includes a ceramic powder phosphor or a single-crystal phosphor; and
the reflective substrate includes aluminum oxide.

13. The lighting device of claim 4, wherein:
the highly reflective internal surface includes a holographic reflective optical element to reflect the laser light rays towards the phosphor plate;
the phosphor plate is transmissive and is coupled to the output surface of the solid medium waveguide; and
the luminaire further includes a reflector or lens coupled to the transmissive phosphor plate on the output surface to shape a beam pattern of the emitted illumination lighting.

14. The lighting device of claim 4, wherein:
the solid medium waveguide is a rectangular shape and the highly reflective internal surface further includes at least one holographic reflective optical element to reflect the laser light rays.

15. The lighting device of claim 14, wherein:
the phosphor plate is transmissive and coupled to the output surface;
the initial highly reflective internal surface portion includes a first holographic reflective optical element to initially reflect the laser light rays to propagate inside the remainder of the solid medium waveguide;
the highly reflective internal surface of the solid medium waveguide is coupled to a second holographic reflective optical element; and
the second holographic reflective optical element opposes the transmissive phosphor plate to further reflect the propagating laser light rays towards the transmissive phosphor plate.

16. The lighting device of claim 4, wherein the output surface includes an antireflective coating.

17. The lighting device of claim 16, wherein:
the phosphor plate is reflective;
the output surface is coupled to a holographic reflective optical element, which is wavelength sensitive, to selectively emit the illumination lighting emitted from the reflective phosphor plate and substantially exclude the reflected laser light rays from emission through the output surface of the solid medium waveguide; and
the luminaire further includes a reflector or lens coupled to the reflective phosphor plate on the output surface to shape a beam pattern of the emitted illumination lighting.

18. The lighting device of claim 4, wherein:
the luminaire further comprises a heat sink coupled to the phosphor plate;
the luminaire further comprises a temperature sensor coupled to the phosphor plate to produce a temperature-dependent voltage output of the phosphor plate; and
the selective control of the laser light source driver includes:
receiving temperature feedback input based on the produced temperature-dependent voltage output of the temperature sensor; and
in response to the temperature feedback input exceeding a temperature threshold, turning off the laser light source.

19. The lighting device of claim 4, further comprising:
a laser light source matrix coupled to the input surface of the solid medium waveguide and including multiple laser light sources, each of the laser light sources configured to be driven by electrical power to emit laser light rays; and
wherein the multiple laser light sources are in different locations to emit the laser light rays directed towards the input surface.

20. The lighting device of claim 19, wherein:
the laser light source matrix is coupled directly or indirectly to the input surface without an air gap; and
the laser light sources of the laser light source matrix are annularly arranged around the input surface.

* * * * *